(12) United States Patent
Boroomand

(10) Patent No.: US 9,616,404 B2
(45) Date of Patent: Apr. 11, 2017

(54) AUTOMATED PEPTIDE PRODUCTION MACHINE

(71) Applicant: Mohammad Boroomand, Louisville, KY (US)

(72) Inventor: Mohammad Boroomand, Louisville, KY (US)

(73) Assignee: Peptide Machines, Inc, San Diego, CA (US)

( * ) Notice: Subject to any disclaimer, the term of this patent is extended or adjusted under 35 U.S.C. 154(b) by 0 days.

(21) Appl. No.: 13/986,693

(22) Filed: May 24, 2013

(65) Prior Publication Data

US 2014/0212337 A1   Jul. 31, 2014

Related U.S. Application Data

(60) Provisional application No. 61/688,931, filed on May 24, 2012.

(51) Int. Cl.
*B01J 19/00* (2006.01)

(52) U.S. Cl.
CPC .. *B01J 19/0046* (2013.01); *B01J 2219/00286* (2013.01); *B01J 2219/00585* (2013.01); *B01J 2219/00686* (2013.01); *B01J 2219/00725* (2013.01)

(58) Field of Classification Search
None
See application file for complete search history.

(56) References Cited

U.S. PATENT DOCUMENTS

| | | |
|---|---|---|
| 3,780,440 A | 12/1973 | Taylor |
| 4,651,863 A | 3/1987 | Reuter et al. |
| 4,746,490 A | 5/1988 | Saneii |
| 5,147,608 A | 9/1992 | Hudson et al. |
| 5,395,594 A * | 3/1995 | Nokihara et al. ............. 422/135 |
| 5,614,608 A | 3/1997 | Krchnak et al. |
| 2002/0031833 A1 | 3/2002 | Heyneker et al. |
| 2005/0169816 A1 | 8/2005 | Kirshner |
| 2007/0140925 A1* | 6/2007 | Phelps .......................... 422/130 |

* cited by examiner

*Primary Examiner* — Lessanework Seifu
(74) *Attorney, Agent, or Firm* — Carrithers Law Office PLLC

(57) ABSTRACT

A device capable of synthesizing a plurality of selected peptides by automatically mixing various amino acids, solvents, and activators and adding these to resins contained in a plurality of individual reaction vessels. A plurality of amino acids are contained in vessels within a carousel which is rotated into position where a syringe is inserted into a selected vessel to transport the amino acid within to a pre-reaction vessel for mixing with other selected amino acids which were previously drawn from the carousel. The mixture of amino acids is then transported to a reaction vessel containing the resin balls for growth of the selected peptide. The device includes a computer, controllable valves, at least one pump, pressurized gas such as nitrogen for transporting fluids, various vessels containing amino acids, solvents, activators, resins, and tubing connecting these elements. The computer is programmable to sample, mix selected components, and apply the mixture to resins for growing peptides.

8 Claims, 27 Drawing Sheets

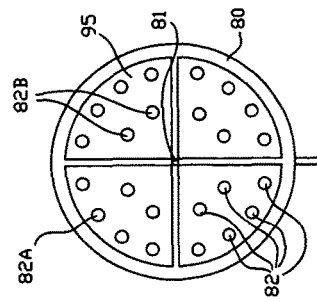
FIG. 36
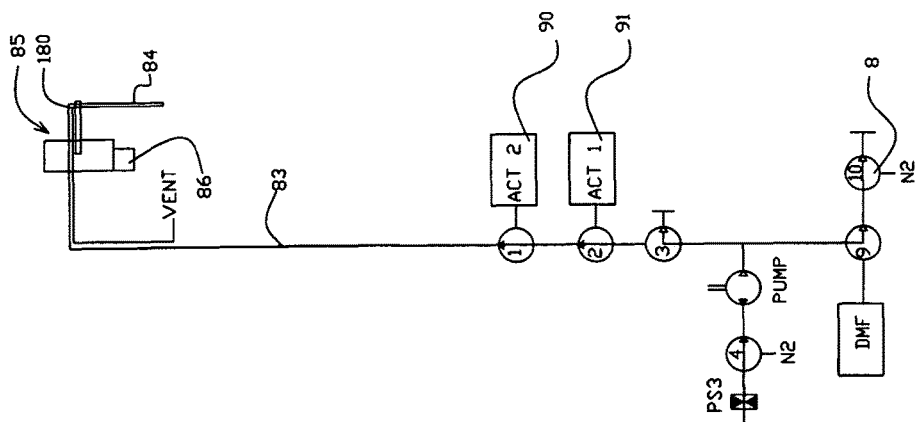
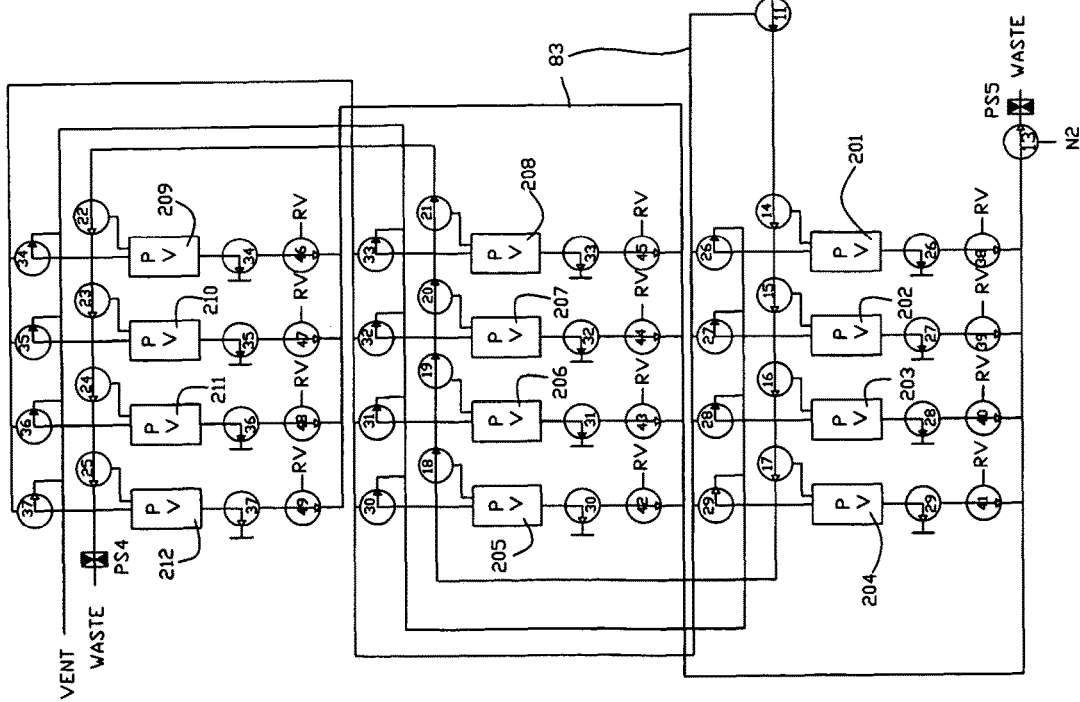
FIG. 1

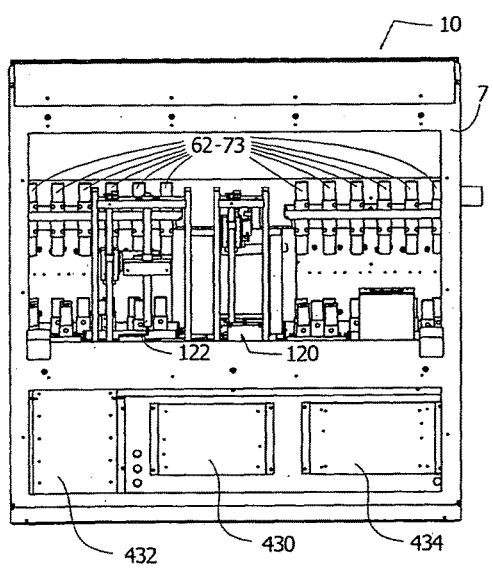
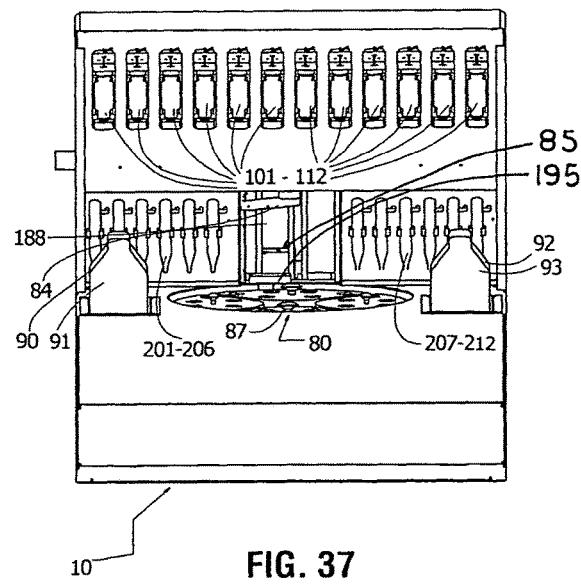
FIG. 3
FIG. 37

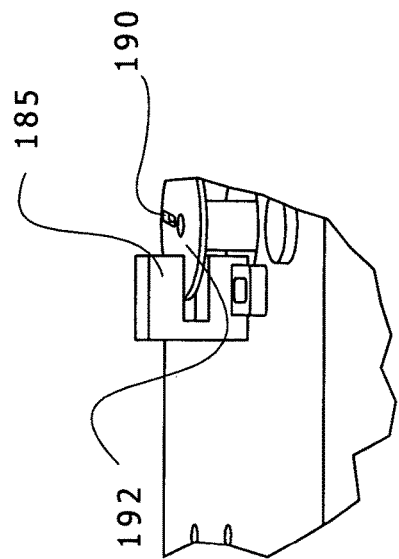
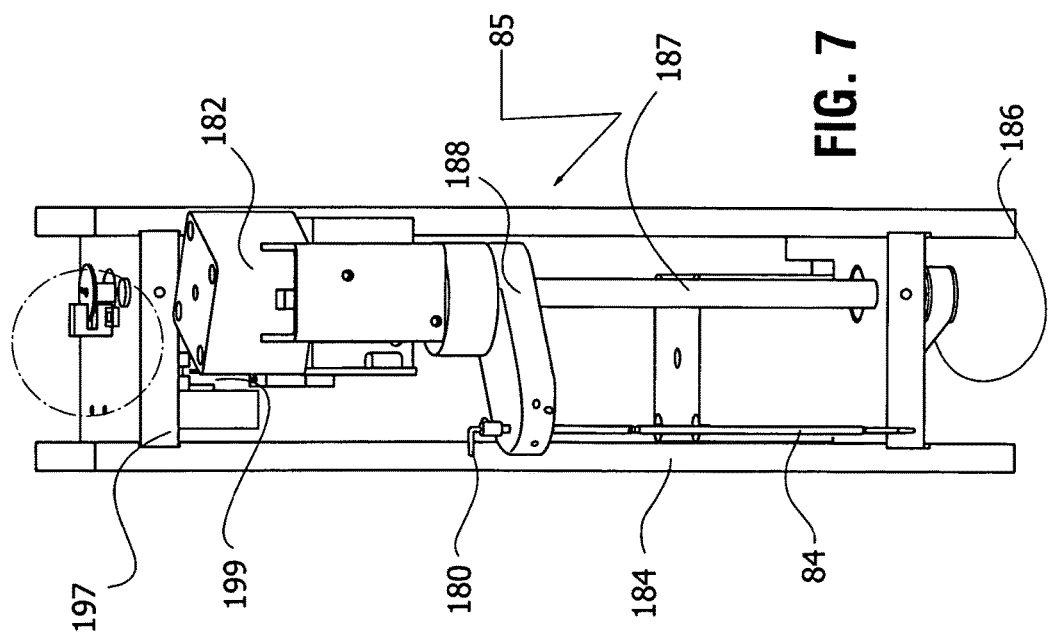

AUTOMATED PEPTIDE PRODUCTION MACHINE

CROSS REFERENCES TO RELATED APPLICATIONS

This application claims priority from U.S. Provisional Application Ser. No. 61/688,931 filed on May 24, 2013 which is incorporated by reference herein.

TECHNICAL FIELD

The present invention relates to the field of machines capable of synthesizing selected peptides.

BACKGROUND OF THE INVENTION

Peptide synthesis is the process by which amino acids are linked by amide bonds to produce peptides. The biological process of making long peptides, that is proteins, is known as protein photosynthesis.

Liquid-phase peptide synthesis is a classical approach to peptide synthesis and has been replaced in most labs by solid-phase synthesis. However, liquid-phase peptide synthesis retains usefulness in large-scale production of peptides for industrial purposes.

Solid-phase peptide synthesis (SPPS), is now the accepted method for creating peptides and proteins in the lab in a synthetic manner. SPPS allows the synthesis of natural peptides which are difficult to express in bacteria, the incorporation of unnatural amino acids, peptide/protein backbone modification, and the synthesis of D-proteins, which consist of D-amino acids. The process typically utilizes small solid insoluble porous beads which are treated with functional units on which peptide chains can be built. The resulting peptide chain will remains covalently attached to the bead until cleaved from that bead by a reagent such as anhydrous hydrogen fluoride or trifluoroacetic acid. The peptide is thus 'immobilized' on the solid-phase media or bead and can be retained during a filtration process, whereas liquid-phase reagents and by-products of synthesis are flushed away.

Repeated cycles of coupling-wash-deprotection-wash creates the desired peptide chain. The free N-terminal amine of a solid-phase attached peptide is coupled to a single N-protected amino acid unit. This unit is then deprotected, revealing a new N-terminal amine to which a further amino acid may be attached. The ability to perform wash cycles after each reaction provides a means to remove excess reagent with all peptide product remaining covalently attached to the insoluble resin bead. The objective is to generate high yield in each step. Thus each amino acid is added in major excess (2~10x) and coupling amino acids together is optimized by the selection of agents. There are two major forms of SPPS utilized in labs and industry, Fmoc and Boc. Unlike ribosome protein synthesis, solid-phase peptide synthesis proceeds in a C-terminal to N-terminal fashion. The N-termini of amino acid monomers is protected by either of these two groups and added onto a deprotected amino acid chain.

SPPS is limited by yields, and typically peptides and proteins in the range of 70 amino acids are pushing the limits of synthetic accessibility. Synthetic difficulty also is sequence dependent and amyloid peptides and proteins are difficult to make.

SUMMARY OF THE INVENTION

In accordance with the present invention, there is presented herein an automated peptide synthesizing machine comprising a cabinet or housing containing a plurality of reagent containers, a plurality of pre-reaction vessels, a plurality of reaction vessels, at least one waste container, a power supply, a plurality of motor controllers, a computer, a motorized amino acid syringe/needle probe assembly, a motorized rotatable amino acid carousel, a fluid metering assembly, and a plurality of fluid and gas control valves and lines connecting the fluid handling elements included above. The computer is capable of controlling valves, motors, and a pump for the purpose of delivering fluids and gases to particular vessels. The computer receives inputs from fluid sensing photo cells and flag sensing photo cells and is programmed to carry out given processes necessary for the synthesizing of peptides and for the delivering of particular selected fluids and gases to particular selected pre-reaction vessels and selected reaction vessels to resulting in synthesizing of distinct peptides within separate distinct reaction vessels so that a different and distinct peptide is synthesized in each of the reaction vessels.

The automated peptide synthesizer is capable of synthesizing differing and distinct peptides in the plurality of reaction vessels simultaneously, each distinct peptide being synthesized in a separate and distinct the reaction vessel. The motorized amino acid needle probe assembly is capable of moving a needle probe down into or up out of an amino acid bottle or a needle probe cleaning agent bottle whereupon fluid is drawn up into the needle probe and on through a connected line to a selected pre-reaction vessel. Further, the needle probe assembly is capable of rotating a needle probe arm to a horizontal position centered over the amino acid bottle or the needle probe cleaning agent bottle.

The needle probe is mounted on a first vertically movable carriage moved by a first motor and belt driven threaded rod. The first vertically moveable carriage is moved to a given vertical position by the motor, belt, and threaded rod wherein the rotation of the rod and therefore the vertical position of the first carriage is sensed by a photocell monitoring a slotted disc rotating on the end of the threaded rod. The motorized amino acid needle probe assembly is controlled by the computer.

The motorized rotatable amino acid carousel contains a plurality of bottles with various amino acids and wherein the rotary position of the carousel is controlled by the computer. The fluid metering assembly includes a clear metering tube with a fluid level sensing photocell fixed within a second vertically moveable carriage wherein the fluid sensing photocell is capable of sensing a fluid level visible through the clear metering tube. The vertical movement of the second vertically moveable carriage is controlled by a second motor, a second belt and a second threaded rod wherein the rotation of the second rod is sensed by a photocell monitoring a slotted disc on the end of the second threaded rod, and movement of the second motor is controlled by the computer.

A plurality of fluid and gas control valves and lines connect the pre-reaction vessels, the reaction vessels, the reagent bottles, the amino acid needle probe assembly, the at least one waste container and the metering vessel, for the purpose of delivering required fluids to vessels for the synthesizing of peptides. The pre-reaction vessels provide a location for the pre-reaction of amino acids and reagents prior to transfer of the amino acids and reagents to the reaction vessel. The reaction vessel provides a location for the reaction of the amino acids and the reagents with resins contained within the reaction vessel to produce desired peptides. The plurality of fluid and gas control valves are controlled by the computer.

It is an object of this invention to provide an automated peptide production machine which is programmed to produce a multiplicity of different peptides, each in an individual reaction vessel, simultaneously.

It is an object of this invention to provide an automated peptide production machine wherein selected amino acids and activators are transferred into a pre-reaction vessel for a selected period of time (for example approximately five minutes), then the mixture is transferred to a reaction vessel containing resin balls comprising small solid insoluble porous beads onto which peptides are grown.

It is an object of this invention to provide an automated peptide production machine including a carousel containing selected amino acids held within vessels and an amino acid transfer arm containing a needle probe which is inserted into a selected amino acid vessel, the amino acid is withdrawn from the vessel and transferred to a pre-reaction vessel to be mixed with other selected amino acids and activators for a selected amount of time which is around five minutes and the needle probe can be rinsed if required between selections.

It is an object of this invention to provide an automated peptide production machine which transfers a premixed combination of amino acids and activators to a reaction vessel containing resin beads which may or may not have amino acid chains grown thereon previously.

It is an object of this invention to provide an automated peptide production machine which contains a plurality of pre-reaction and reaction vessels wherein separate and possibly different peptides are being synthesized simultaneously according to a program contained within the computer wherein that program may be changed as desired. The number of different pre-reaction and reaction vessels is only limited by the practicality and capability of the hardware to mix, process, and transfer the elements within the machine in an effective amount of time. A preferable range is 4 to 12 pre-reaction and reaction vessels.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 1 is a piping schematic of that portion of the automated peptide synthesizer which includes the pre-reaction vessels and the hardware used in the pre-reaction portion of the peptide synthesis and a top view of the amino acid carousel and transfer conduits in fluid connection with a selected number "twelve" pre-reaction vessels;

FIG. 3 is a rear view of the automated peptide synthesizer cabinet/housing showing the location of the stepper controller, interface boards, power supply cabinet vent, three way valves, amino acid needle delivery assembly, delivery pump location and waste block;

FIG. 7 is front view of the amino acid delivery assembly including the z-axis stop, home position sensor and holder block, rotary motor movement, z-movement assembly section, rotary probe holder, probe, guide rods and lead screw for z-axis, belt and pulleys;

FIG. 36 is a top view of a carousel holding amino acid containers within a subtray.

FIG. 37 is a front view of the automated peptide synthesizer cabinet showing the reaction vessel assembly for 12 units, pre-reaction vessels, reagent bottles, amino acid needle delivery assembly and amino acid turn table and containers therein of FIG. 3;

FIG. 40 is an enlarged view of the depth encoder and sensor (photo cell) of the amino acid delivery assembly of FIG. 7;

DESCRIPTION OF THE PREFERRED EMBODIMENTS

Figure 2:
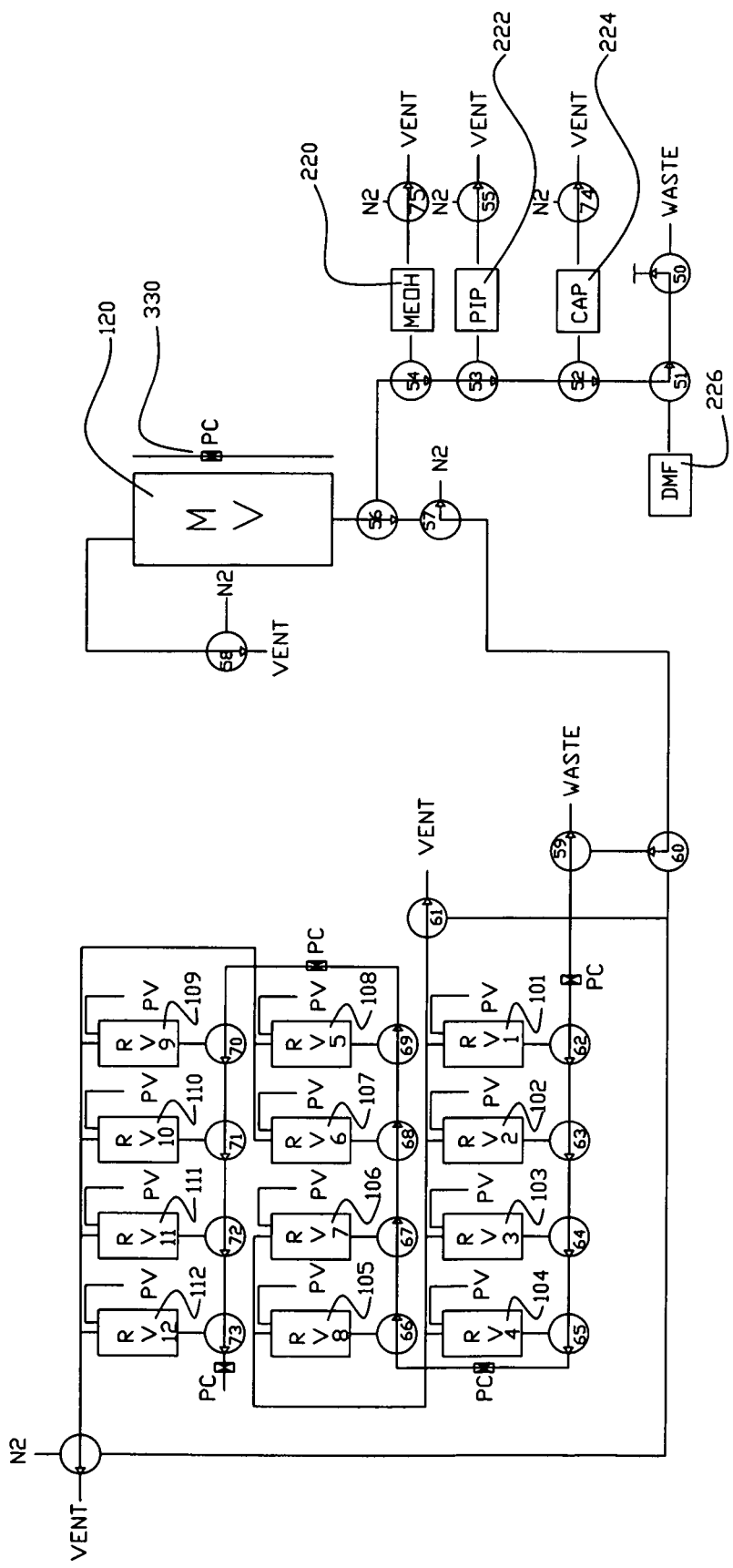
FIG. 2 is a piping schematic of the portion of the automated peptide synthesizer which includes the reaction vessels including the hardware which delivers the amino acids, activators, and reagents from the pre-reaction vessels to resins in reaction vessels for synthesizing peptides.
Figure 4:
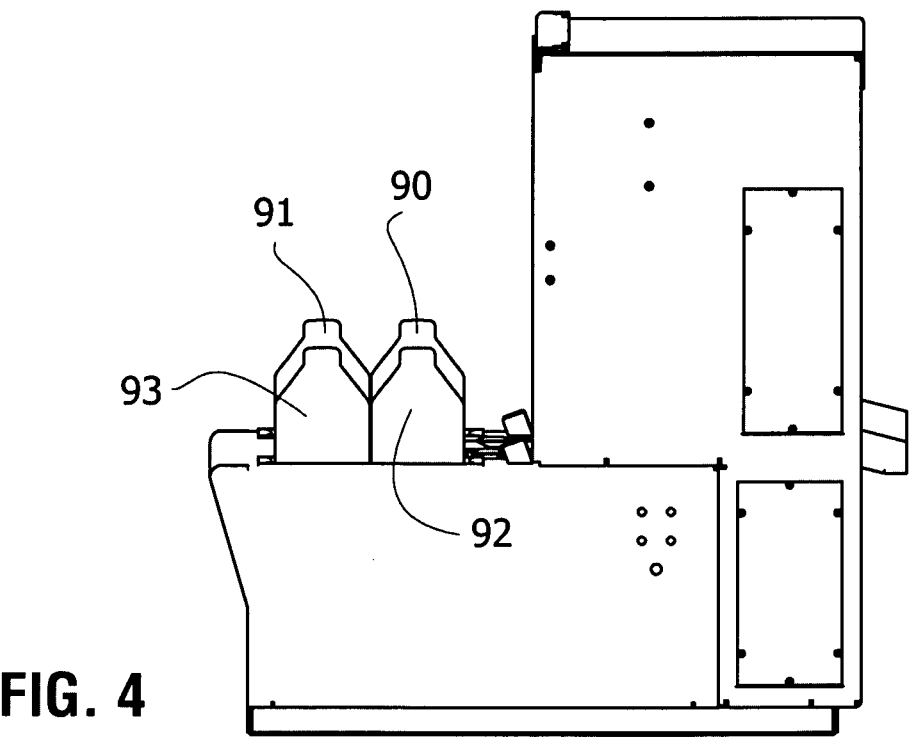
FIG. 4 is a view of the right side of the automated peptide synthesizer cabinet showing the reagent bottles, reagent bottles tube connections, connectors for DMF and PIP and nitrogen connector, access door to valves, waste blocks, and access door to the electronics.
Figure 38:
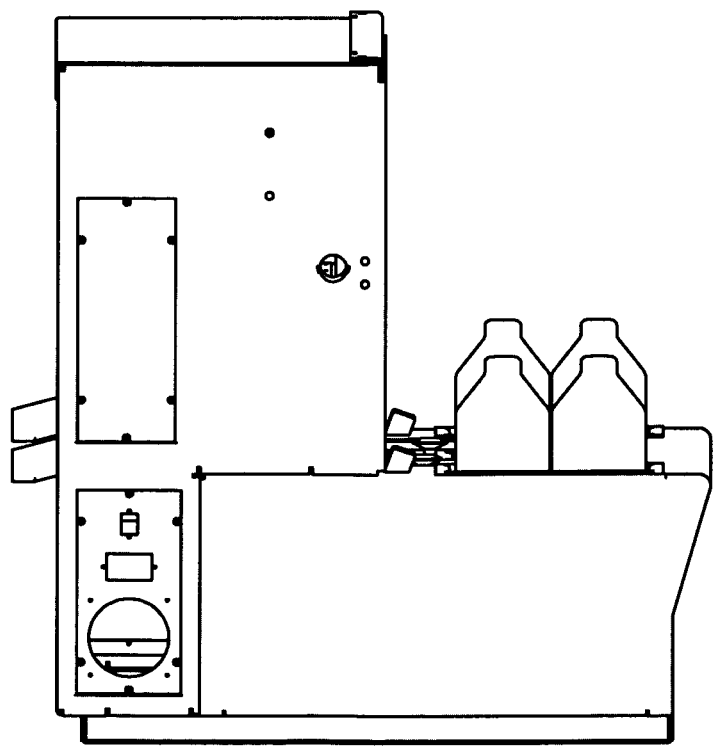
FIG. 38 is a view of the left side of the automated peptide synthesizer showing the cooling fan, power module switch, communication cable connection, and reagents bottle connections of FIG. 4.
Figure 5:
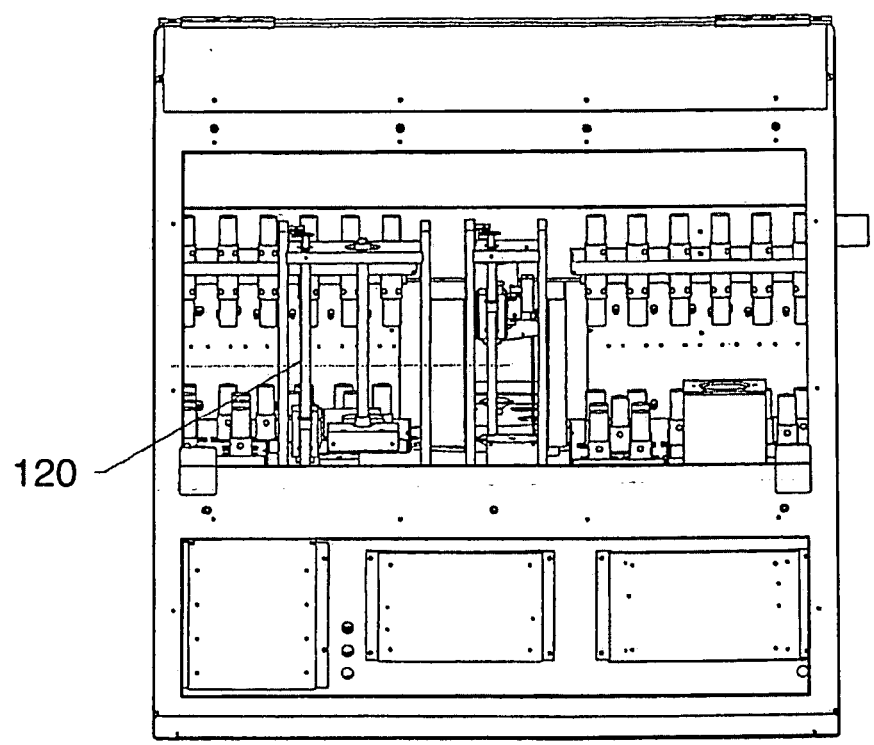
FIG. 5 is a rear view of the automated peptide synthesizer showing the solvent measuring assembly.

The automated peptide synthesizer 10, shown in the figures includes a cabinet 7, reaction vessels 101-112, pre-reaction vessels 201-212, reagent bottles 90-93, a carousel 80, a carousel motor 88 (shown in figure 36), an amino acid delivery needle probe assembly 85, a metering assembly 120, a fluid pump 5, solenoid valves 1- 4, 8, 9 and 11- 75, and a control system including a power supply 434, and a computer 430 and stepper motor drivers 432 which control the motors in the carousel 80, the amino acid delivery needle probe assembly 85, the metering assembly 120, and the fluid pump 5.

In this specification, it is understood that the valves are all electrically controlled solenoid valves. Where shown in the schematics, the valves are drawn in the de-energized state. The valves have three ports: A, B and C. As drawn, fluid flows into port A and out through port B and port C is closed. If the valve becomes energized, fluid flows into port A and out through port C and port B is closed.

It is also understood that, as shown in FIGS. 13, 14, 15, 46, 16, 17 and 47, the reaction vessels 101-112 are removably held within a bracket assembly 136 and are manually removed and replaced as follows: while holding the reaction vessel 106, for example, with one hand, use the other hand to urge top seal holder 130 toward the top grip 132 to release and free the top of reaction vessel 106, thus allowing vessel 106 to be removed. At this point, a user either replaces vessel 106 with another selected vessel or prepares vessel 106 to be returned to the original vessel holder 136 by emptying, cleaning and replacing new resins into vessel 106 for a new peptide synthesizing procedure. Replacing vessel 106 into vessel holder 136 is the reverse of the removal process. Reaction vessels of varying volumes are provided, all of which are capable of being held in vessel holder 136. The reaction vessels 106 are cylindrical and the volumes depend on the particular diameter of a given reaction vessel. Pre-reaction vessels 201-212 are not intended to be removable but are used and cleaned automatically by the automated peptide synthesizer 10 by way of the connected fluid lines and valves.

Figure 39:
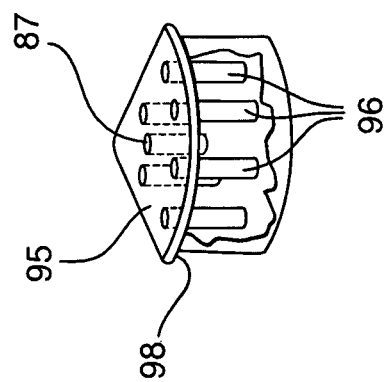
FIG. 39 is a perspective view showing an enlarged view of the weight plate having cylindrical bores or sleeves for holding removable bottles therein of FIG. 6.
Figure 6:
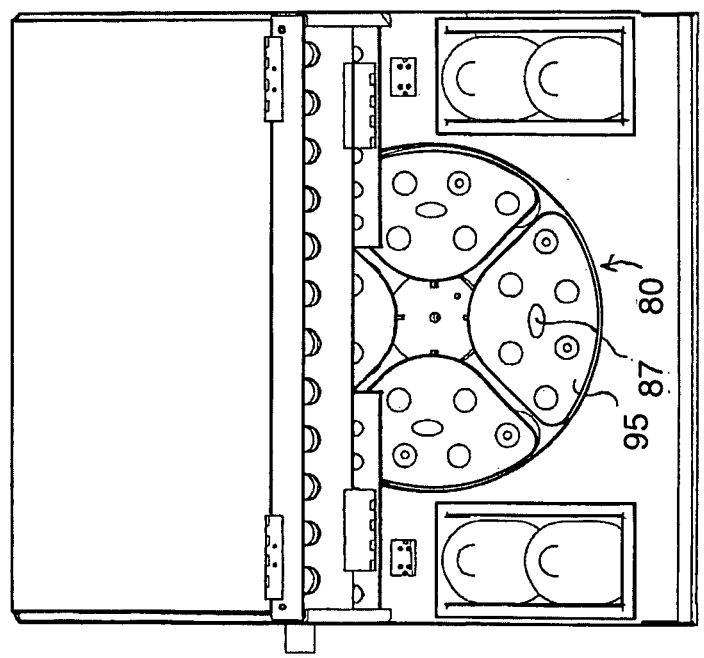
FIG. 6 is a top view of the automated peptide synthesizer showing the amino acid containers, amino acid carousel for holding the bottles, and weight plates, reagent bottle block tube connections, and reagent bottles.

A two part schematic of the automated peptide synthesizer 10 is shown in figures +a 36 and 2. Figure 36 shows the pre-reaction portion of the synthesizer. Different amino acids are held in amino acid containers 82 within carousel 80, shown in figure 36. Carousel 80 holds up to 24 amino acid containers, each containing a different amino acid. Shown in FIGS. 6 and 39, carousel 80 is a circular turn table tray holding four sub-trays 95. Each sub-tray 95 includes a knob type handle for lifting the sub-tray 95 from or into the turn table tray. As shown in figures 6 and 39, each sub-tray 95 is capable of holding up to six amino acid containers 82 within the acid container receptacles 96. The sub-trays 95 provide a quick and easy method for a user to supply and replenish amino acids to synthesizer 10. As shown in FIGS. 1 and 36, carousel motor 88 causes carousel 80 to rotate on pin 81 whereby the tip of needle probe 84 is brought into horizontal alignment with the center of the top opening of a selected acid container 82, thus selecting a particular amino acid to be drawn to a particular pre-reaction vessel, as shown in figure 37. Sub-trays 95 are located and supported in the turn table tray by a lip 98 at the top marginal edge of sub-tray 95.

Figure 8:
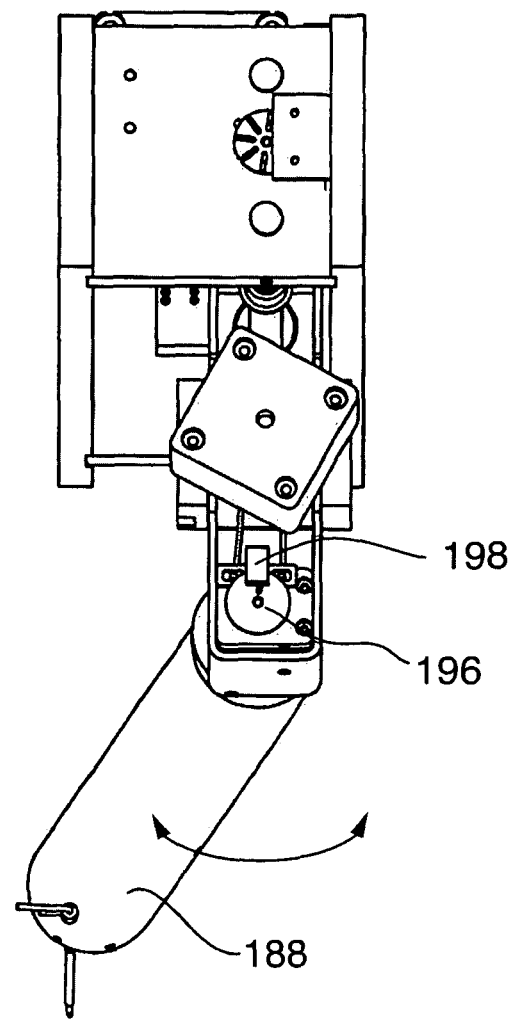
FIG. 8 is front perspective view of the amino acid delivery assembly including the lead screw encoder and sensor (photo cell), stepper motor for rotary movement, belt for rotary needle movement, rotary home position sensor (photo cell), rotary movement/needle holder plate, and probe;.
Figure 9:
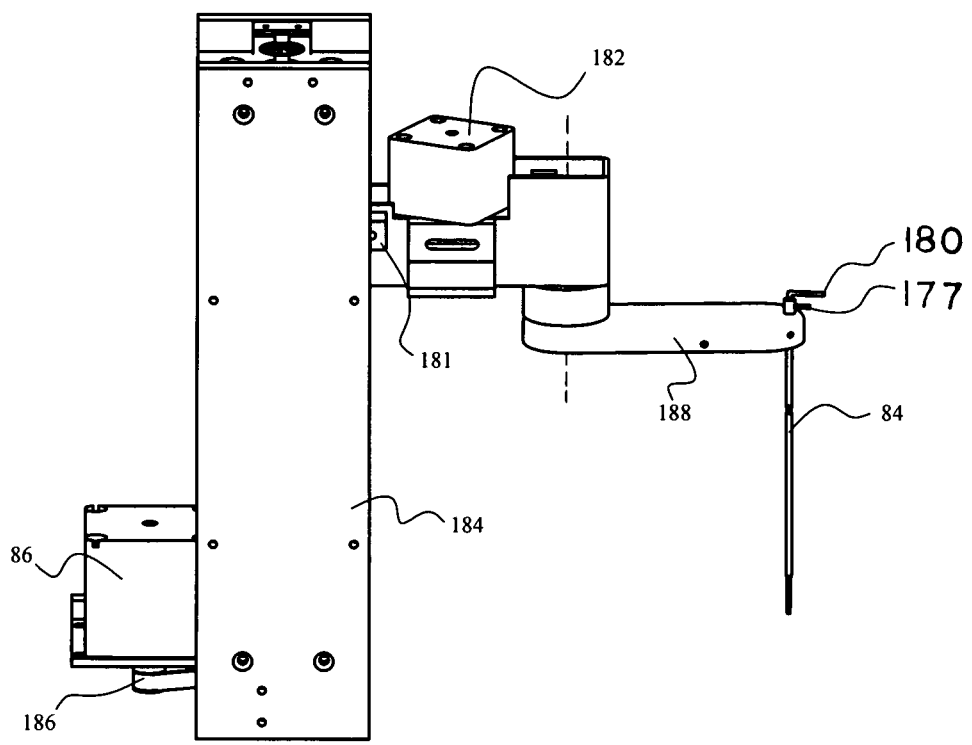
FIG. 9 is a left side view of the amino acid delivery assembly showing the z-axis motor, lead screw encoder, motor for rotary action, liquid detection sensor, and motor mount, tube connection tho the pump, amino acid container vent, probe rotary holder, and probe.
Figure 43:
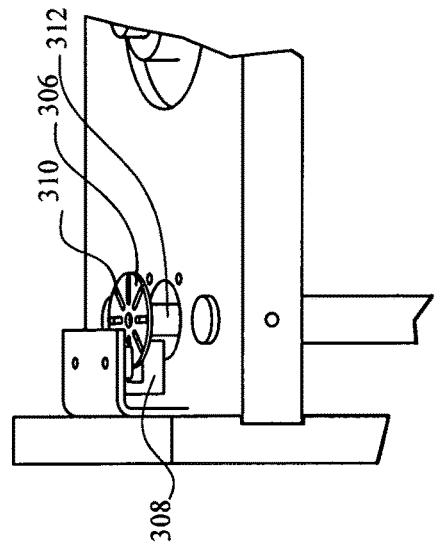
FIG. 43 is a perspective view of the photo cell holder and lead screw movement encoder consisting a wheel and photo cell of FIG. 10.
Figure 10:
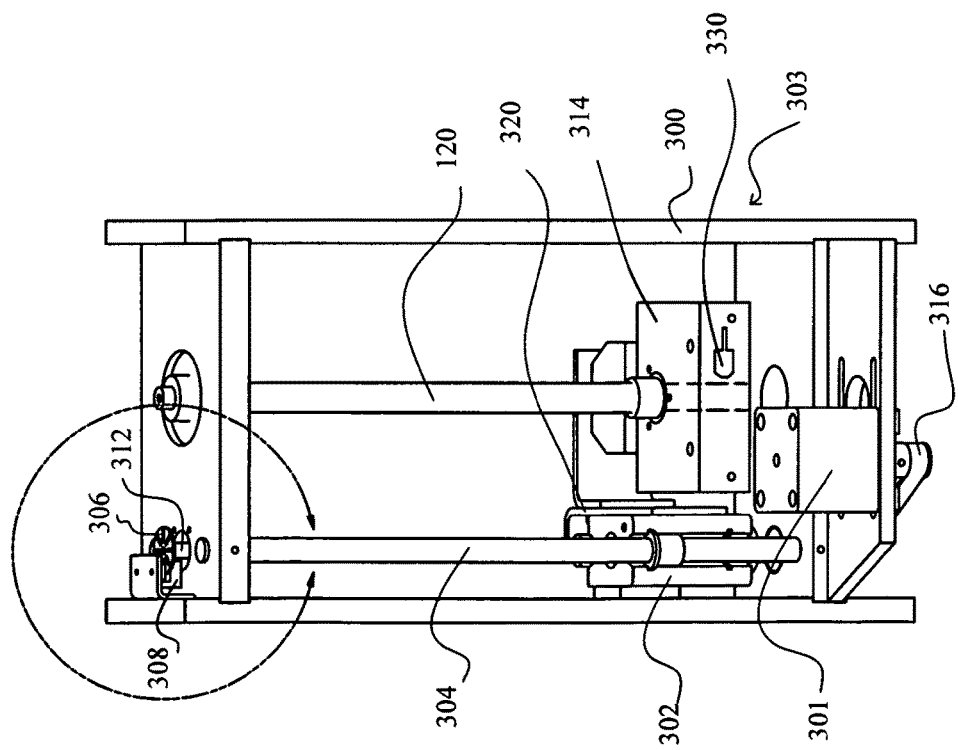
FIG. 10 is a front view of the measuring vessel assembly shows the assembly guide rods, and lead screws, photocell/optical coupler with photo transistor housing, stepper motor and measuring vessel.
Figure 44:
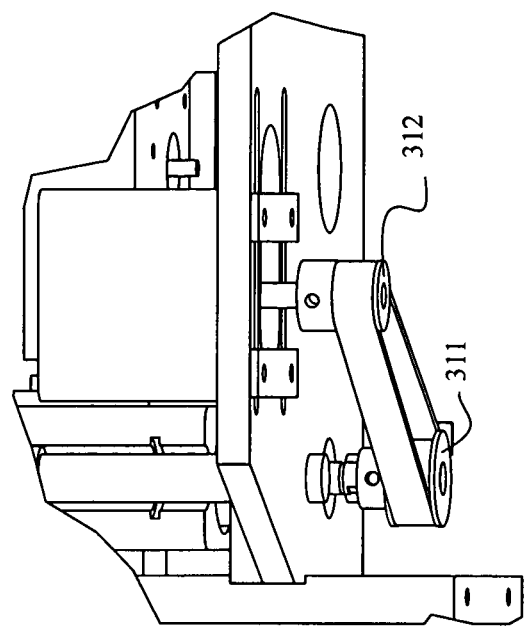
FIG. 44 is an enlarged view of the lower portion of the measuring vessel assembly of FIG. 11 showing the motor, motor mount, belt to drive the lead screw and pulleys.
Figure 11:
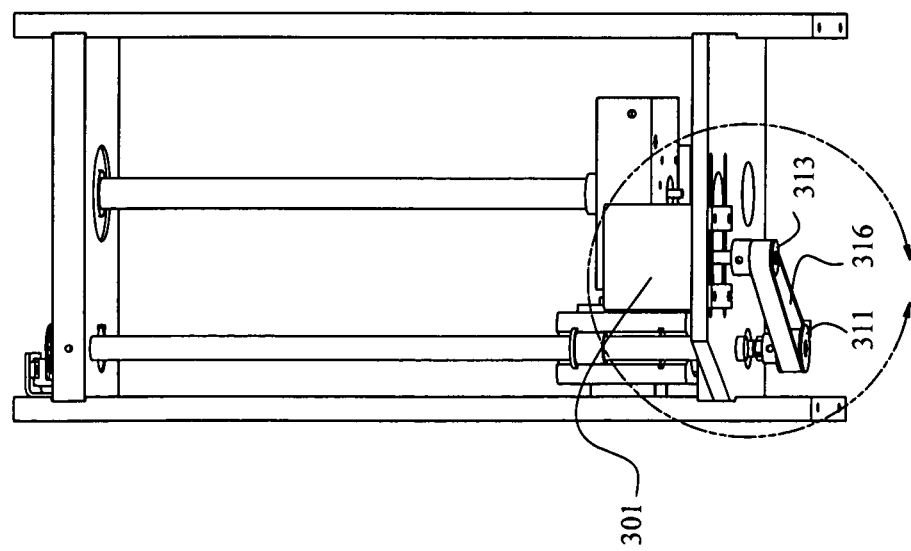
FIG. 11 is a right side perspective view from underneath the measuring vessel assembly showing the guide rods and lead screw, measuring vessel, and a photocell carriage member driven by a toothed pulley for the purpose of lifting and lowering the photocell carriage.
Figure 12:
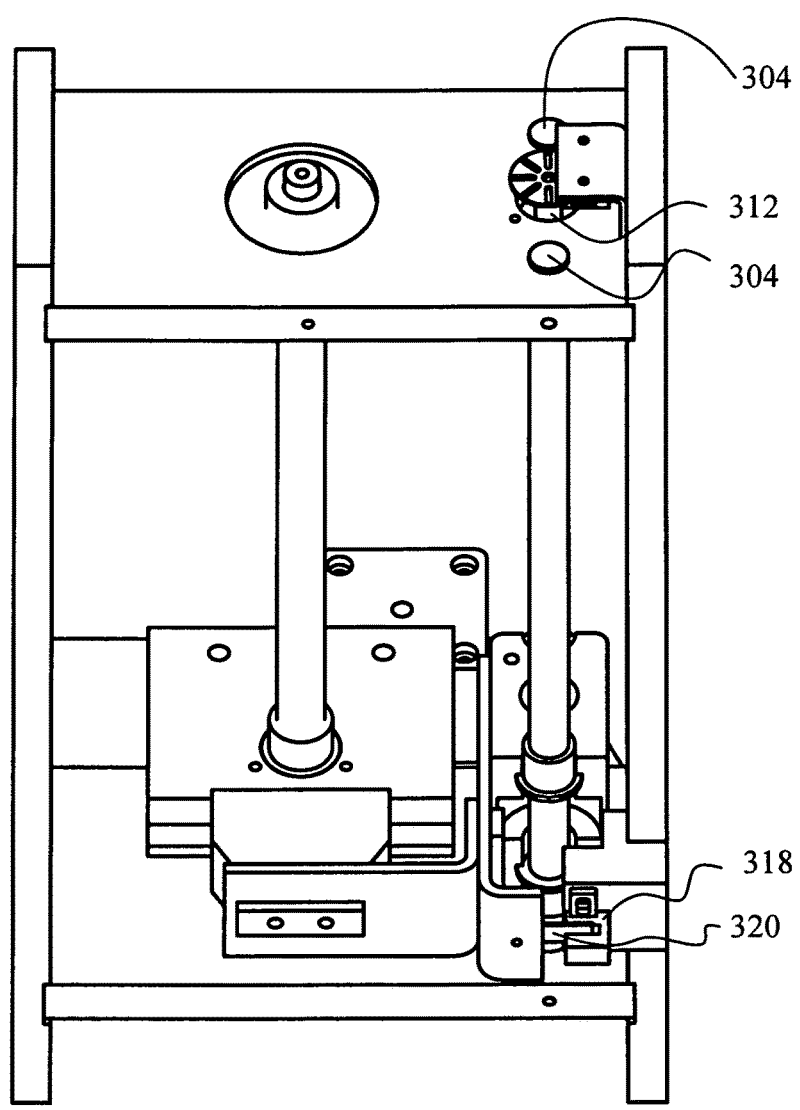
FIG. 12 is a left side perspective view from above the measuring vessel assembly showing the measuring vessel, photocell holder block, lead screw encoder, motor, lead screw nut holder block, bearing for guide rods, home photo cell, and home photo cell tang.
Figure 14:
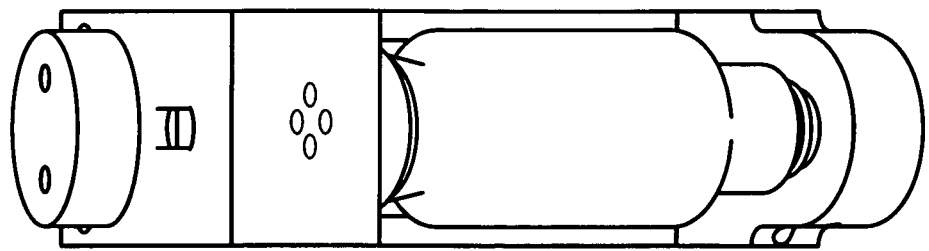
FIG. 14 is a front view of a reaction vessel and holder.
Figure 13:
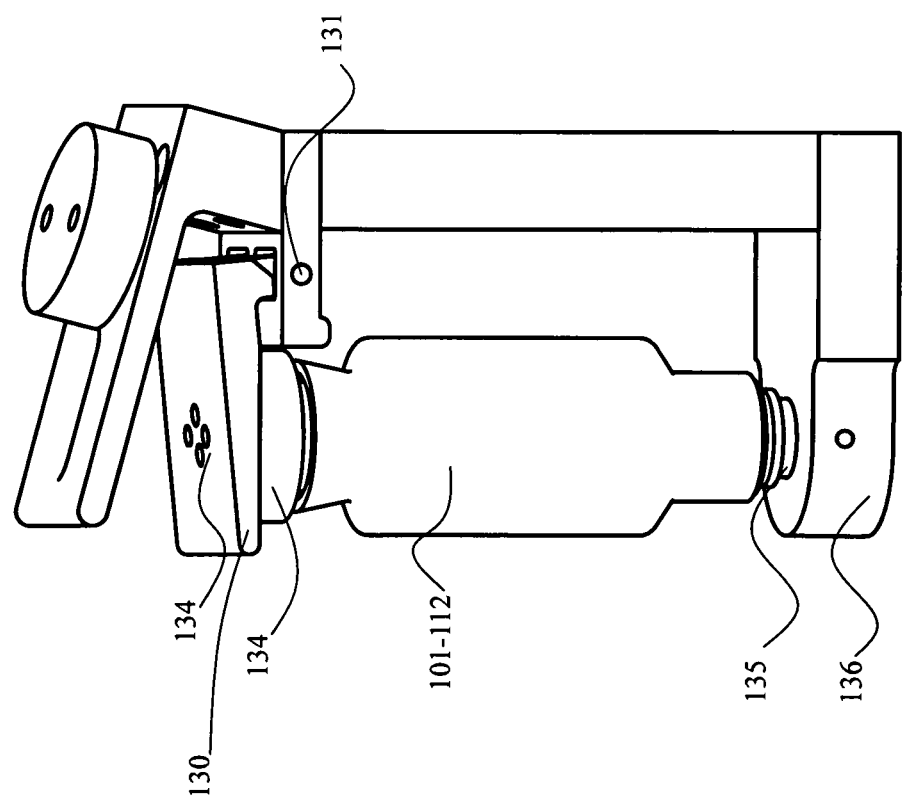
FIG. 13 is a right side perspective view of a reaction vessel and holder showing the top grip to release the reaction vessel, top seal spring loaded holder, reaction top seal, bottom reaction vessel seal, filter holder inside of the reaction vessel, glass reaction vessel, pivot rod and cabinet attachment block.
Figure 46:
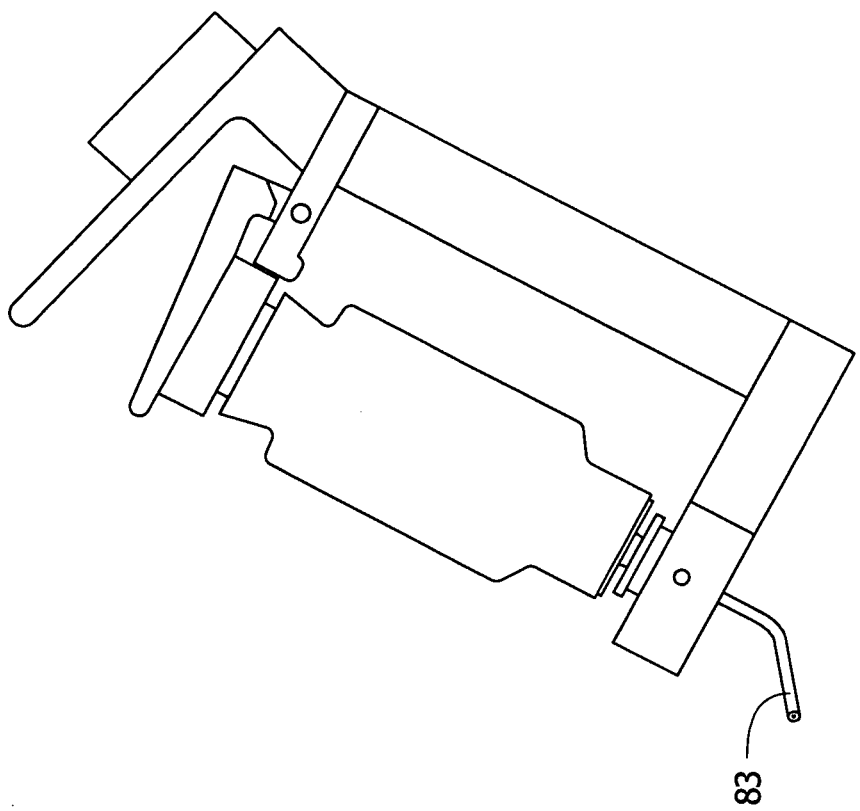
FIG. 46 is a side view of the reaction vessel of FIG. 15.
Figure 15:
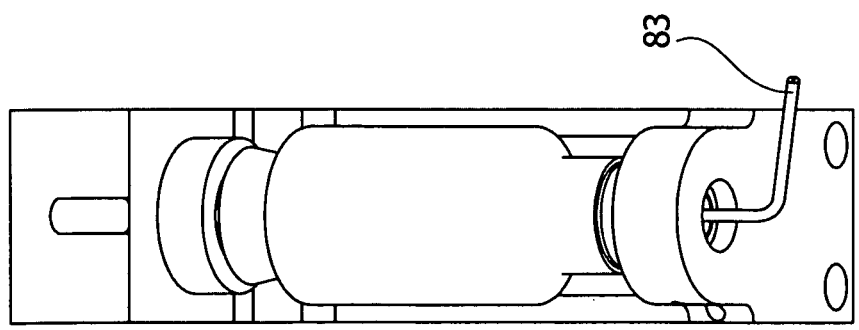
FIG. 15 is a front perspective view of a reaction vessel and holder showing the bottom seal and tube connection of the reaction vessel.
Figure 16:
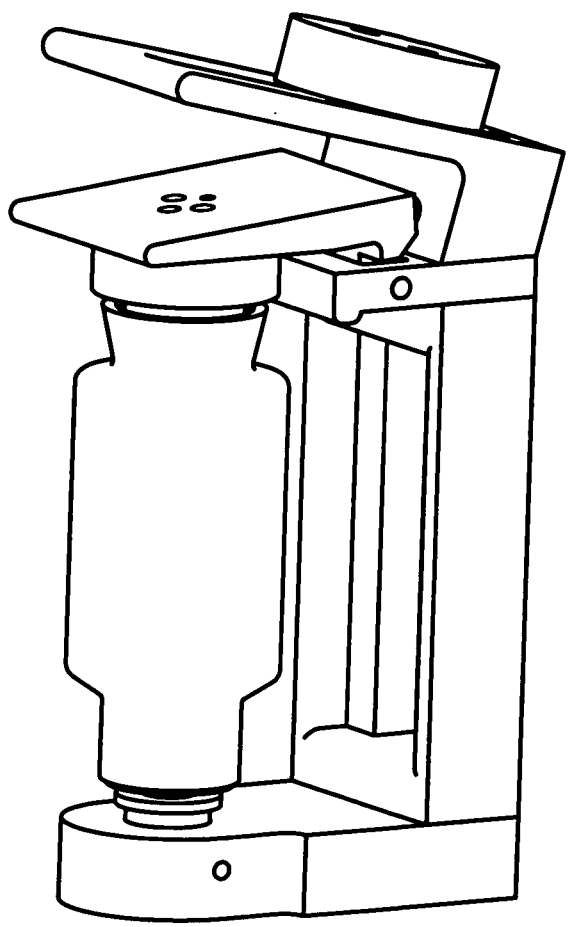
FIG. 16 is a perspective view of a reaction vessel and holder.
Figure 47:
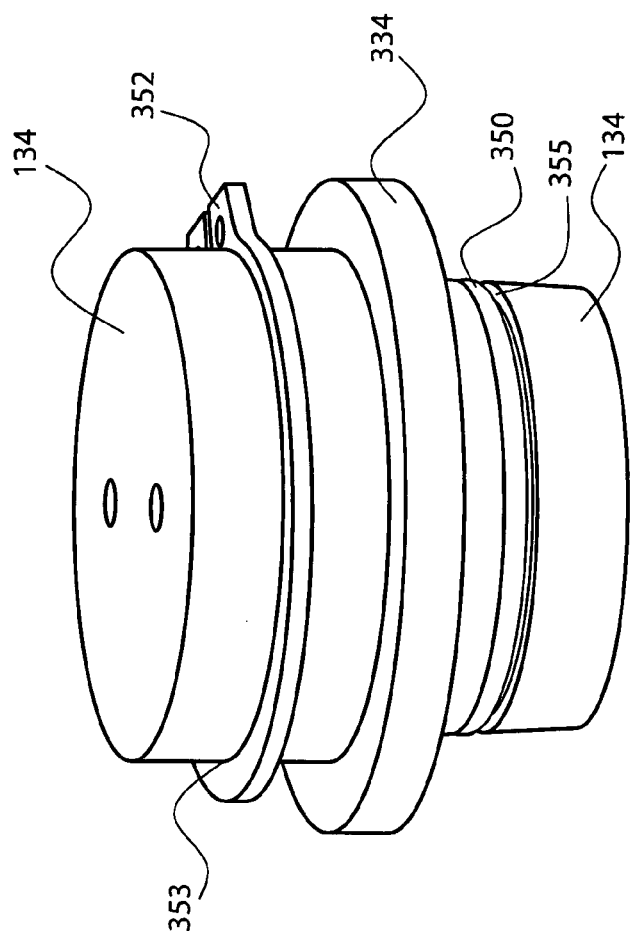
FIG. 47 is a perspective view of a bottle cap insert from just above.
Figure 17:
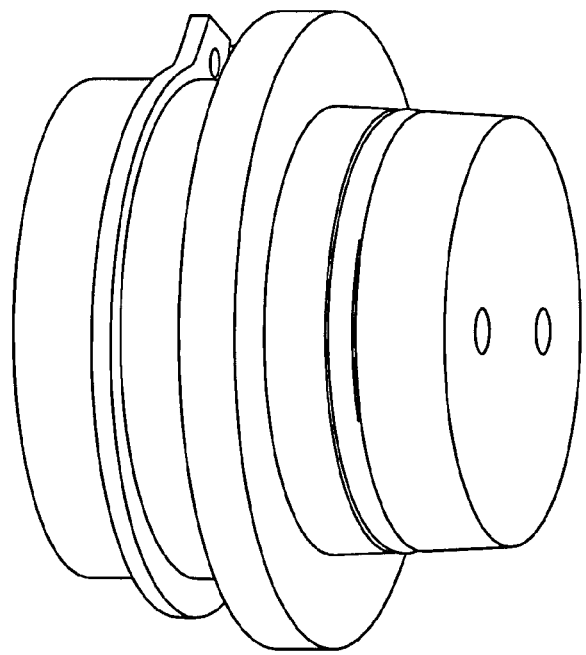
FIG. 17 is a perspective view of a bottle cap insert composed of TEFLON, the snap ring to hold the cap in place, the o-ring seal of the bottom and tube insert.
Figure 45:
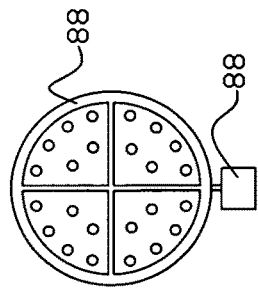
FIG. 45 is a top view of a carousel subtray.

The amino acid delivery needle probe assembly 85, shown in FIGS. 7, 40, 41, 42, 8, and 9, includes a frame 184, a threaded lead screw 194, a threaded carriage block 191, guide rods 187, a lead screw toothed belt 186, a toothed drive pulley 183, a toothed driven pulley 189, a z-axis motor 86, and a sub-frame 193 which holds a rotary motor 182, a rotary arm 188, and an amino acid needle 84. Amino acid needle 84 includes two nipples at the top, a suction line nipple 180 and a vent line nipple 177 as shown in FIG. 9. Z-axis motor 86 turns to drive lead screw 194 which in turn moves carriage block 191 up or down. Carriage block 191 carries sub-frame 193 along with rotary motor 182, rotary arm 188 and amino acid needle 84, all as one unit, up and down. Therefore, when needle probe 84 needs to plunge downward into an amino acid container 82, stepper rotary motor 86 runs, turning lead screw 194, which causes sub-frame 193 to move needle probe 84 downward. There is a home flag or tang 199 which is sensed by home photocell 197 when the needle assembly is at the top of the range of vertical movement. There is also an encoder wheel 190 with slits 192 which are counted by photocell 185 to provide precise vertical positioning of needle 84. With respect to the schematic in figure 1, nipple 180 of needle probe 84 is connected by tubing 83 to valves 1, 2 and 3 and to pump 5. Pump 5 is, in turn, connected to a top inlet of a selected one of pre-reaction vessels 201-212 by energizing a selected one of valves 14-25.

With respect to FIG. 39, carousel 80 contains four sub-trays 95, each with six amino acid containers 82a and 82b and a knob-type handle 87. Looking at the overall carousel 80, there are 16 outer amino acid container 82a forming an outer circle and there are eight inner amino acid containers 82b, forming an inner circle. As shown in FIG. 37, rotary arm 188 is positioned, with amino acid needle 84 over amino acid container 82a. In this position, carousel 80 can be rotated to locate any one of the 16 outer amino acid containers directly under needle 84, at which time, Z-axis motor 86 can be driven to cause needle 84 to plunge down into the selected amino acid container 82a. In order to access any one of the eight amino acid containers in the inner circle of the carousel 80, rotary motor 182 is driven to rotate needle 84 out to a position where the carousel 80 can be rotated to a position where a selected one of the inner amino acid containers 82b is directly under needle 84.

When the amino acid has been drawn from any one of containers 82a or 82b, needle 84 needs to be removed from the container and cleaned. Z-axis motor 86 is driven in reverse to raise needle 84 from the container. A cleaning station 195 is located toward the rear side of synthesizer 10 just behind carousel 80. Therefore, rotary motor 182 is driven to rotate rotary arm 188 toward the rear of the synthesizer 10 to a position directly over cleaning station 195. At this time, z-axis motor 86 is driven to plunge needle 84 into a solvent within cleaning station 195. Solvent is drawn in and out of needle 84. Needle 84 is now raised out of cleaning station 195 and is ready to be used again. It can be seen that there are three stationary positions for rotary arm 188: the first position being with needle 84 located over the cleaning station 195, the second position being with the needle 84 over the outer circle of amino acid containers 82a and the third position being with needle 84 over the inner circle of amino acid containers 82b. FIG. 8 shows rotary arm 188 connected to a home position wheel 196 containing one slit. Home position wheel 196 therefore rotates with rotary arm 188. Home position photocell 198 senses the slit in home position wheel 196 when rotary arm 188 causes needle 84 to be positioned over cleaning station 195.

To deliver, for example, a selected amount of the amino acid in acid container 82a into the pre-reaction vessel 206, motor 88 rotates carousel 80 so that the selected amino acid container 82a is directly under needle probe 84. Motor 86 lowers needle probe 84 down into amino acid container 82a. With respect to FIG. 36, valve 19 is energized to open the top right inlet port of pre-reaction vessel 206 to the fluid line 83. Valve 3 must also be energized to allow fluid to the pump 5. Pump 5 is now started. Amino acid is drawn from amino acid container 82a, through fluid line 83, valves 1, 2, 3, 4, 11, and 14-18, whereupon energized valve 19 diverts the amino acid into the top right inlet of pre-reaction vessel 206. Pump 5 runs until the desired amount of amino acid is delivered. The needle is then withdrawn from amino acid container 82a, and is rotated and plunged into a solvent within cleaning station 195 to be cleaned. In this same manner, any of the amino acids contained within the 24 amino acid containers 82 held within carousel 80 may be added to any of the pre-reaction vessels 201-212 by energizing the proper one of the diverter valves 14-25.

Further, to deliver a selected amount of Activator 1 or 2, contained in vessels 91 and 90 respectively, to the pre-reaction vessel 206, either valve 1 or valve 2 must be energized to allow the desired activator fluid to be pumped from either vessel 90 or 91, after which, pump 5 is started to deliver the activator through valves 3, 4, 11, 14-18 and then the fluid is diverted by valve 19 into the top right inlet port of pre-reaction vessel 206. As stated in the paragraph above, Activators 1 or 2 may be pumped to any of the pre-reaction vessels 201-212 by energizing the proper one of the diverter valves 14-25.

After the amino acids and activators are added to the selected pre-reaction vessel, vessel 206 in this example, the mixture is allowed a selected amount of time, approximately 5 minutes, to react.

A selected amount of resin has previously been placed within reaction vessel 106 by hand. Referring to FIGS. 13, 14, 15, 46, 16, 17 and 47, this is accomplished by urging top seal holder 130 toward top grip 132 to release reaction vessel 106. Reaction vessel 106 is then lifted and removed by hand and a selected amount of resin is added to the reaction vessel 106. Reaction vessel top seal 134 is rigidly fixed to the bottom of the top seal holder 130. As top seal holder 130 is urged upward and rotated about pivot pin 131, top seal 134 is raise out of and above the top opening of reaction vessel 106, for example. Now, reaction vessel 106 is grasped and raised up and out of the bottom of reaction vessel holder 136. The bottom reaction vessel seal 135 includes a rubber stopper 137 with a central drain hole and a TEFLON filter 133 above the stopper 137. When resin is added to reaction vessel 106, the TEFLON filter 133 prevents resin from escaping through the drain hole in stopper 137. Further, when amino acids and solvents are added and then drained from reaction vessel 106, the TEFLON filter 133 prevents the resins and attached peptides from draining out of the reaction vessel 106. Now, reaction vessel 106, along with the resins which were added, is returned to reaction vessel holder 136.

With reference to FIGS. 13, 14, 15, 46, 16, 17 and 47, the top seal 134 comprises a TEFLON stopper-like seal with two parallel axial apertures to receive incoming fluid lines. TEFLON is trademark of the DuPont Corporation of Wilmington, Delaware. Top seal 134 includes an integral exterior shoulder 334 and parallel slot 353 with a snap ring 352. Top seal 134 is inserted into an aperture within the top seal holder 130 and snap ring 352 is applied so that top seal 134 is captured between shoulder 334 and snap ring 352 to hold top seal 134 snugly onto top seal holder 130. Below shoulder 334 is another slot 355 wherein resides an elastomeric O-ring 350 to form a pressure tight seal between the fluid lines and the reaction vessel.

After the pre-reaction time of five minutes or so, the fluid mixture is delivered from the pre-reaction vessel 206 to the reaction vessel 106. To accomplish this, valves 4 and 11 must be energized to put pressurized nitrogen to the top port of valve 31. Valves 31 and 43 are then energized to allow the pressurized nitrogen to force the mixture out of the bottom outlet of pre-reaction vessel 206 to a fluid line. In FIG. 2, the fluid line is connected directly to the top right inlet port of reaction vessel 106. Therefore, the mixture flows directly into the top right inlet port of reaction vessel 106. It should be noted that valves 26 through 37 are dual valves with one half of the valve being connected above the adjoining pre-reaction vessel and the other half of the valve being connected below the adjoining pre-reaction valve. Therefore, it can be seen in FIG. 1 that valves 14-25 are energized to add fluid to the respective pre-reaction vessels 201-212 and that valves 26-37 are energized to remove or empty fluid from the respective pre-reaction vessels 201-212.

After the fluid mixture has been added to the resin in reaction vessel 106 as described above, a reaction takes place wherein peptides are grown onto the resin particles. This reaction typically takes around 45 minutes to one hour or more. After this reaction is complete, the fluid residue is removed by opening drain valve 67.

If desired, more amino acid fluid mixtures may be applied to the same resin and peptides to grow longer peptide polymers, using the same steps as described. Further steps in the process include cleaning vessels, resins and peptides with solvents such as DMF.(dimethylformamide).

Solvents and reagents such as DMF, MeOH, and piperidine are used in the process and delivered to reaction vessels by valves 51-75. It can be noted that MeOH container 220 and piperidine container 222 can be vented or pressurized with nitrogen by control valves as needed but that DMF container 226 is always pressurized. As needed, any of these is routed to metering vessel 120 to be measured precisely, and then delivered to the desired reaction vessel. For example, to deliver a precise amount of piperidine to reaction vessel 106, valve 55 is energized to pressurize piperidine vessel 222. Valve 53 and 56 are energized to send piperidine through valve 53, 54 and 56 into metering vessel 120 until a photocell 330 within the fluid measuring assembly 300 senses the liquid, indicating that enough liquid has been sent into metering vessel 120. Photocell 330 was previously placed at the proper vertical position with respect to vessel 120 by stepper motor 301 as follows. Now valve 56 is de-energized, valve 58 is energized to apply pressurized nitrogen to the top of metering vessel 120 and valves 57, 59 and 67 are energized to route the fluid from metering vessel 120 to reaction vessel 106.

As best shown in FIGS. 10, 43, 11, 44, and 12 10a-12, metering assembly 300 includes a frame 300, a metering vessel 120 which is a vertical clear tube, a photocell carriage frame 320 which surrounds metering vessel 120 and moves vertically while carrying an internal photocell 330 capable of sensing the fluid level within vessel 120, a photocell carriage member 302 with female threads being threaded onto a threaded vertical rod 312 driven by a toothed pulley 311 for the purpose of lifting and lowering the photocell carriage 320, and a stepper motor 301 with a toothed driving pulley 316, a toothed belt rotatably connecting pulleys 311 and 313. At the top of threaded rod 312 is a disc 306 with eight slots 310 and a photocell 308 for the purpose of counting revolutions of threaded rod 312 and therefore providing feedback as to the distance which the photocell carriage has moved. There is also a home tang or flag 320 which is sensed by a home photocell 318 when the carriage is at a bottom position. Upon power up, the stepper motor 301 drives the carriage to the home photocell 318. From this point forward, the computer drives the motor 301 and counts pulses from photocell 308 to determine the precise vertical position of the photocell carriage. When a specific amount of fluid is required, the computer causes the stepper motor 301 to drive the metering photocell 330 to the proper height corresponding to the specific amount of fluid required, then, the proper valves are energized to fill the metering tube 120 until photocell 330 senses the fluid. Then the valves are de-energized because the proper amount of fluid has been delivered to the metering vessel.

As can be seen in FIGS. 36 and 2-6, there are 12 sets of pre-reaction vessels, reaction vessels, and fluid control valves which provide the user with the capability of programming 12 separate and different processes for synthesizing 12 different peptides. One such set of the mentioned twelve sets has been used as an example process in the preceding discussion and includes:

Set 6. pre-reaction vessel 206 with connected valves 19, 31, and 43, reaction vessel 106 with connected valve 67. The other eleven sets are as follows:

Set 1. pre-reaction vessel 201 with connected valves 14, 26, and 38, reaction vessel 101 with connected valve 62;

Set 2. pre-reaction vessel 202 with connected valves 15, 27, and 39, reaction vessel 102 with connected valve 63;

Set 3. pre-reaction vessel 203 with connected valves 16, 28, and 40, reaction vessel 103 with connected valve 64;

Set 4. pre-reaction vessel 204 with connected valves 17, 29, and 41, reaction vessel 104 with connected valve 65;

Set 5. pre-reaction vessel 205 with connected valves 18, 31, and 42, reaction vessel 105 with connected valve 66;

Set 7. pre-reaction vessel 207 with connected valves 20, 32, and 44, reaction vessel 107 with connected valve 68;

Set 8. pre-reaction vessel 208 with connected valves 21, 33, and 45, reaction vessel 108 with connected valve 69;

Set 9. pre-reaction vessel 209 with connected valves 22, 34, and 46, reaction vessel 109 with connected valve 70;

Set 10. pre-reaction vessel 210 with connected valves 23, 35, and 47, reaction vessel 110 with connected valve 71;

Set 11. pre-reaction vessel 211 with connected valves 24, 36, and 48, reaction vessel 111 with connected valve 72;

Set 12. pre-reaction vessel 212 with connected valves 25, 37, and 49, reaction vessel 112 with connected valve 73.

These 12 sets of vessels and valves are intended to operate independent of one another according to the program which is stored within the onboard computer 434 to synthesize as many as twelve separate and different peptides simultaneously.

Other embodiments of this peptide synthesizer include the same elements but have fewer sets of pre-reaction vessels, reaction vessels and connected valves. For example, one embodiment has only four such sets and therefore can only be used to synthesize four independent peptides simultaneously. Another embodiment contains 16 sets of pre-reaction vessels, reaction vessels and connected valves and therefore can be used to synthesize up to sixteen independent peptides simultaneously. An even higher number of sets of pre-reaction vessels, reaction vessels and connected valves is possible but higher numbers of components become impractical when there are too many processes taking place for the moving mechanical components such as the carousel, needle probe and metering assembly to keep satisfied. In other words, in order to keep 12 processes running simultaneously, each individual process needs amino acids and reagents delivered to pre-reaction and reaction vessels at the proper times. This requires a minimum amount of time to perform each of these deliveries. If the amount of time to deliver these to each pre-reaction and reaction vessel is, on average, five minutes per process, and each synthesizing process takes, on average, one hour (60 minutes), then at most, 12 processes can be simultaneously satisfied by the automated synthesizer of the present invention (5×12=60). If, however, the average amount of time to deliver these amino acids and reagents is four minutes, then an automated synthesizer of the present invention with 15 sets of pre-reaction vessels, reaction vessels and connected valves is practical (4×15=60). Thus, it can be seen that there is a practical upper limit to number of simultaneous processes, and therefore, the number of sets of pre-reaction vessels, reaction vessels and connected valves which are practical to include in any embodiment of the present invention.

Figure 18:
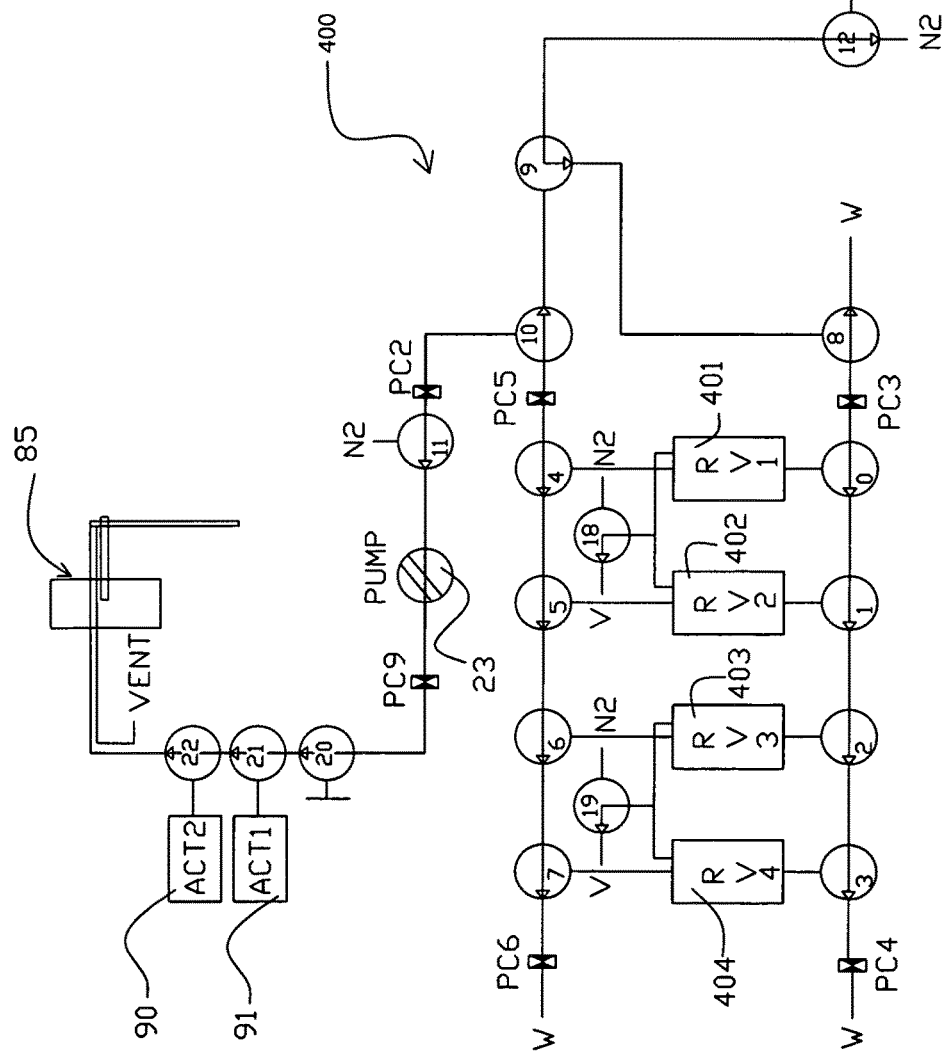
FIG. 18 is a piping schematic of the four reaction vessel embodiment of the present invention.
Figure 19:
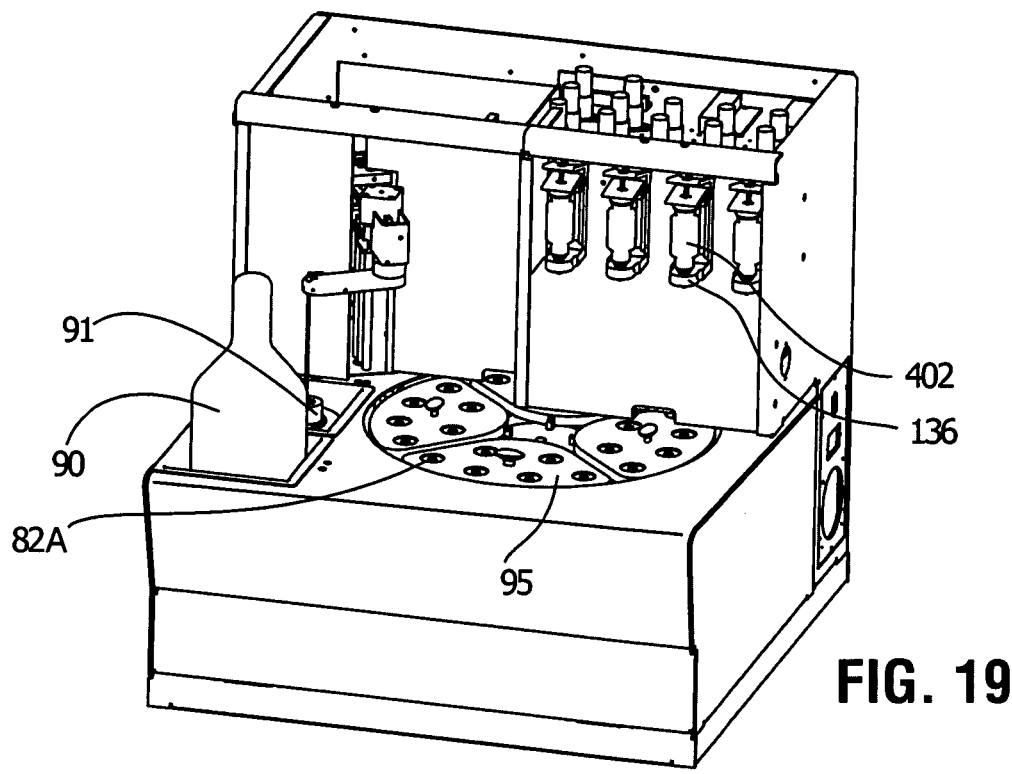
FIG. 19 is a perspective view of the peptide synthesizer.
Figure 20:
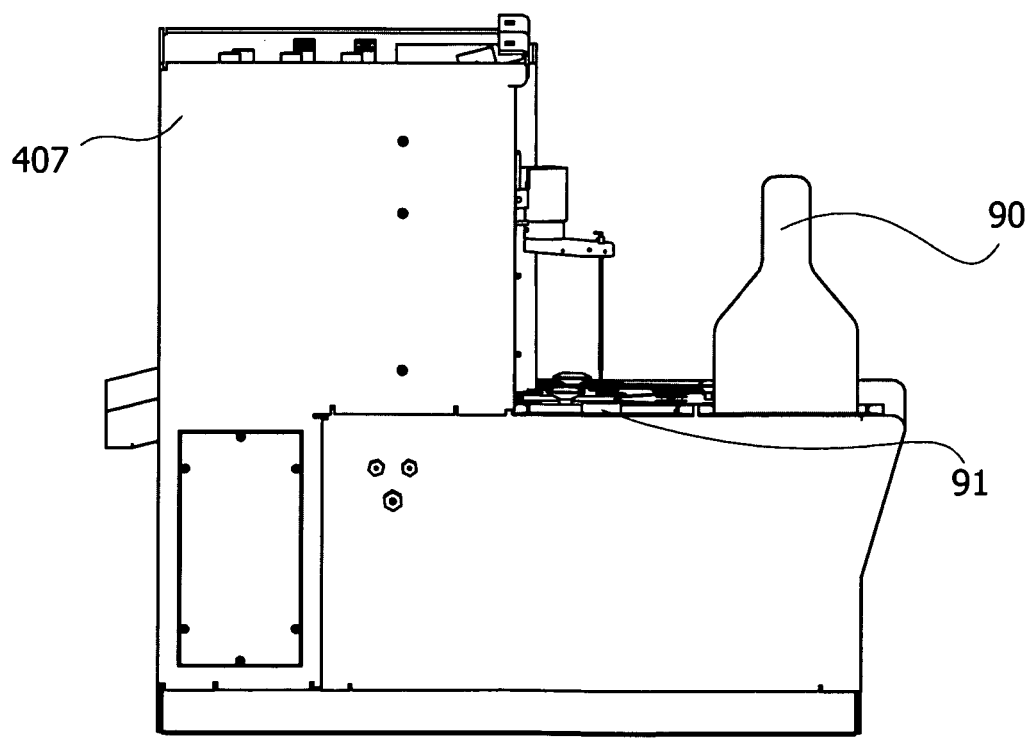
FIG. 20 is a left side view of the peptide synthesizer of FIG. 18 showing the waste blocks, electronics access panel, pip bottle, DMF gas and liquid connections, and nitrogen connection.
Figure 21:
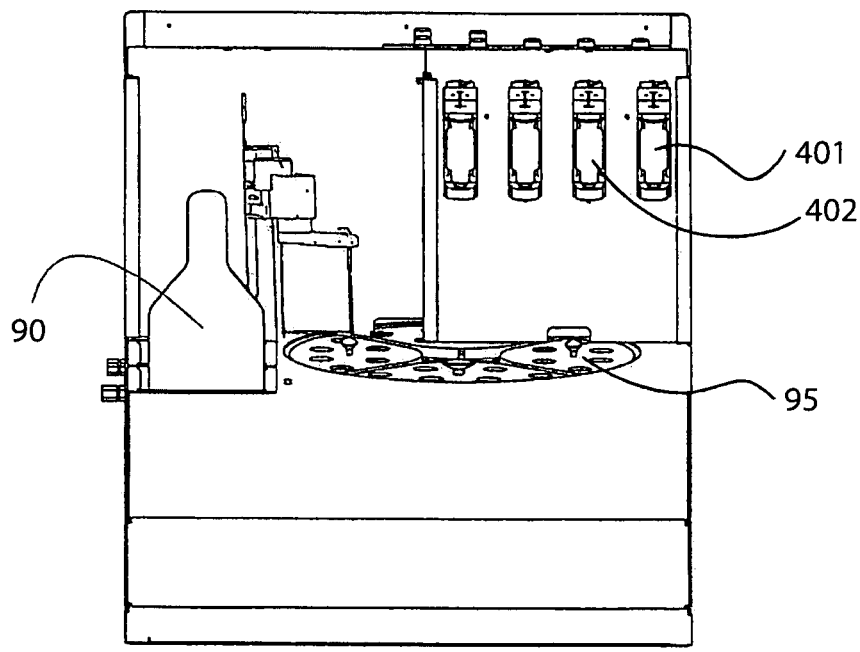
FIG. 21 is a front view of the peptide synthesizer of FIG. 18 showing the nitrogen and DMF tube connections, robotic needle assembly, reaction vessel assembly, and amino acid carousel.
Figure 22:
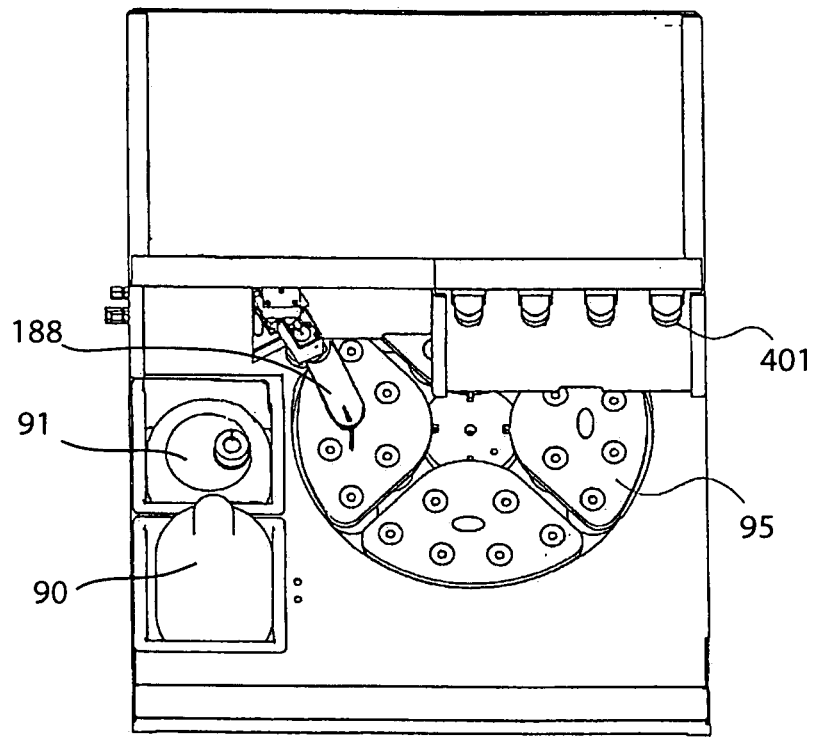
FIG. 22 is a top view of the peptide synthesizer of FIG. 18 showing the tube connections for the gas and DMF, reagent bottle PIP bottle, amino acids weight bottles, amino acid bottles, reaction vessel assembly, and robotic needle assembly for delivering amino acids and reagents.
Figure 23:
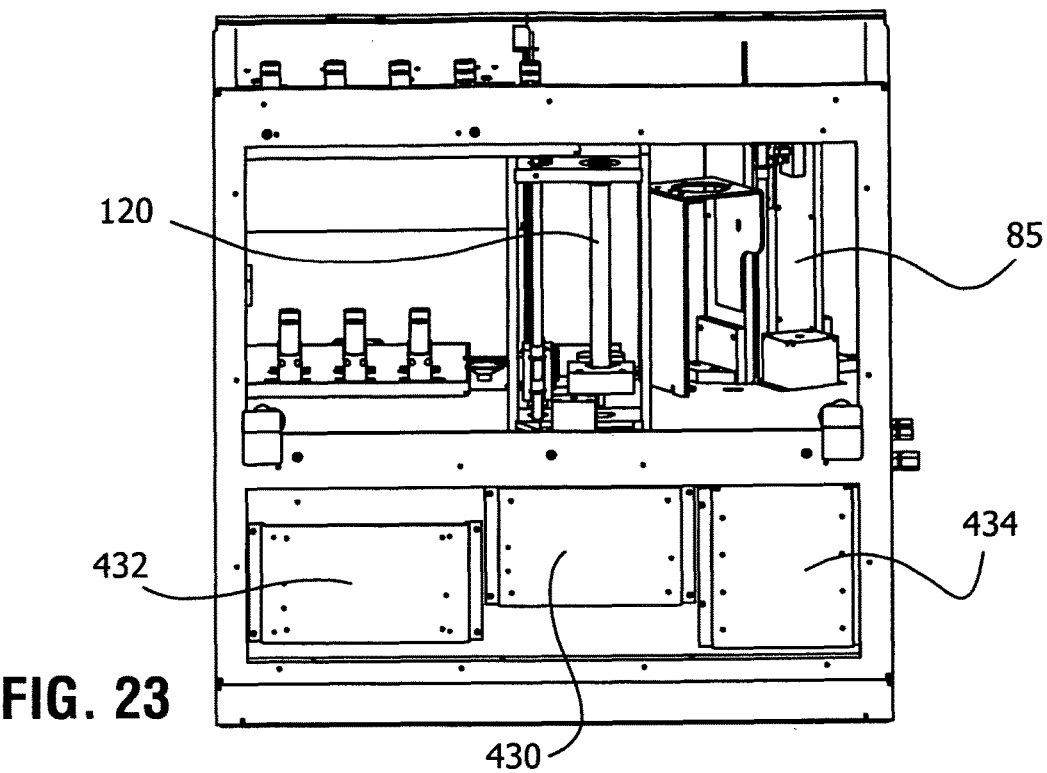
FIG. 23 is a rear view of the peptide synthesizer of FIG. 18 showing the measuring vessel assembly, valve connections, bottom valve panel, waste block, power supply location, electronics location, stepper driver boards location, tube connections for the gas and DMF, amino acid pump location, robotic needle assembly and top valve panel.
Figure 24:
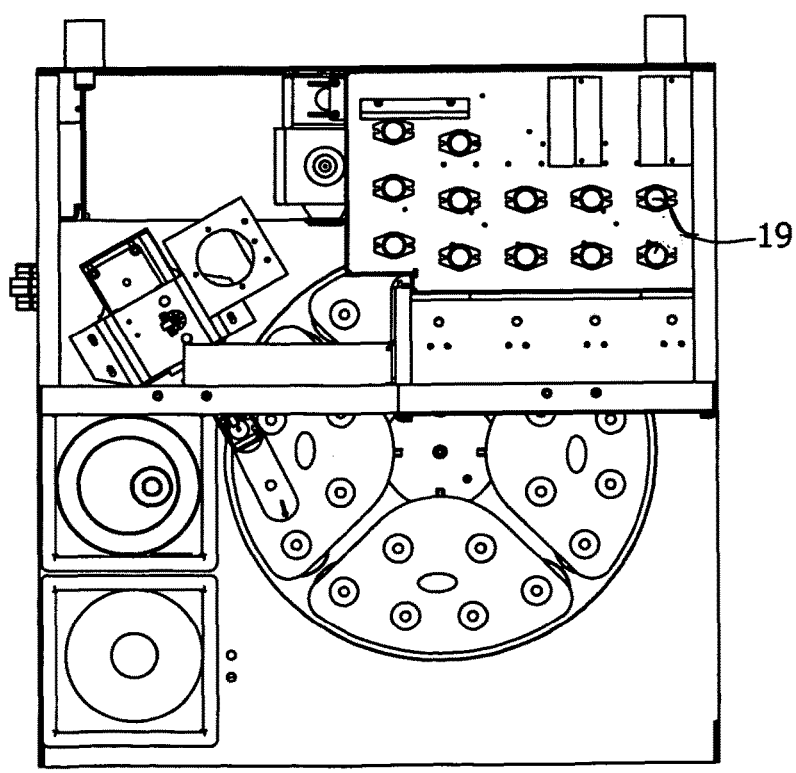
FIG. 24 is a top view of the peptide synthesizer of FIG. 18 with to top cover removed showing the amino acid pump, robotic needle assembly, reagent bottle PIP bottle, amino acid weight guide, amino acid carousel, top valve panel, valve connections, waste block and photo cell connections.
Figure 25:
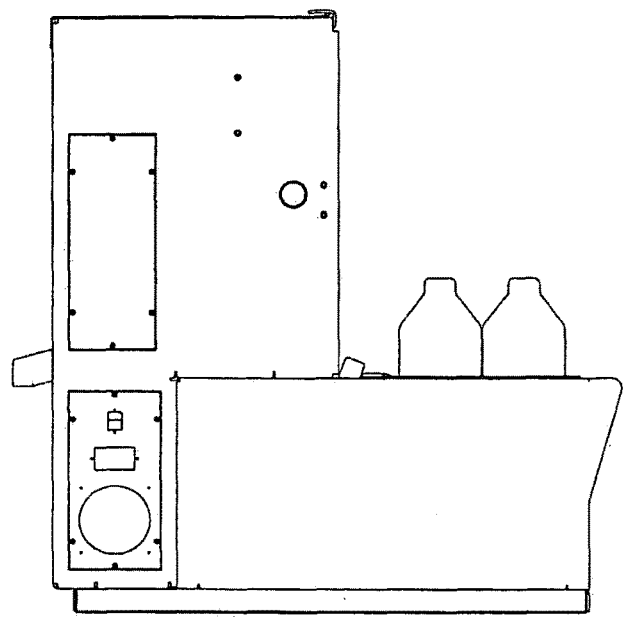
FIG. 25 is a left side view of the peptide synthesizer showing the waste connection, USB connection, power entry module fan location, and reagent bottle tube connection.
Figure 26:
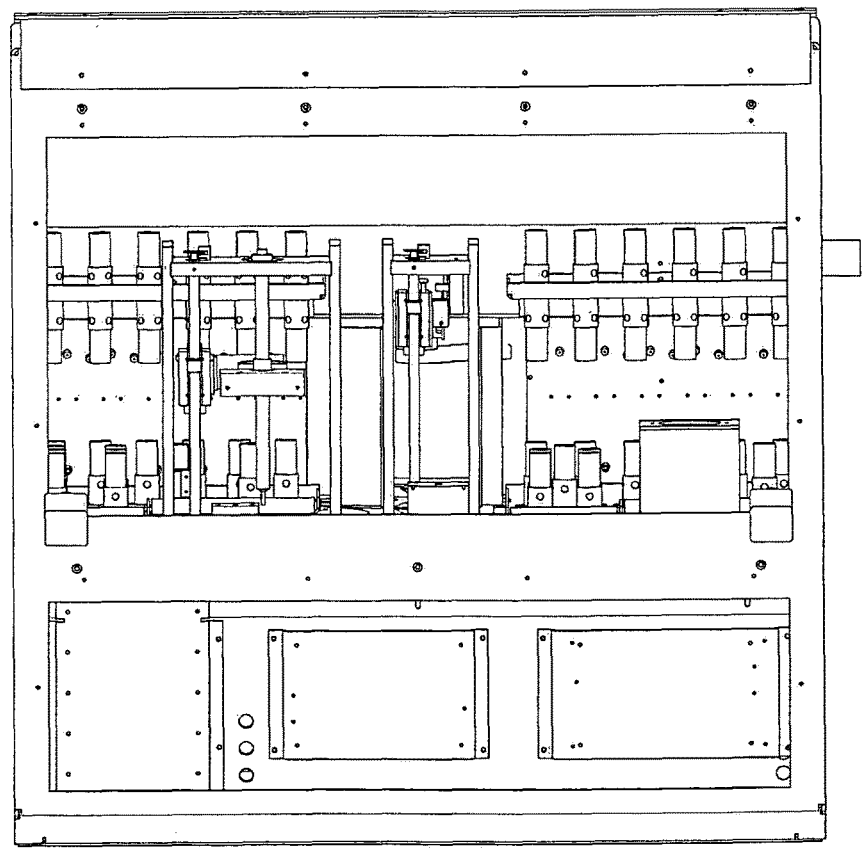
FIG. 26 is a front view of the peptide synthesizer showing the cabinet vent, valve and robotics assembly compartment, waster connections, and electronics compartment.
Figure 27:
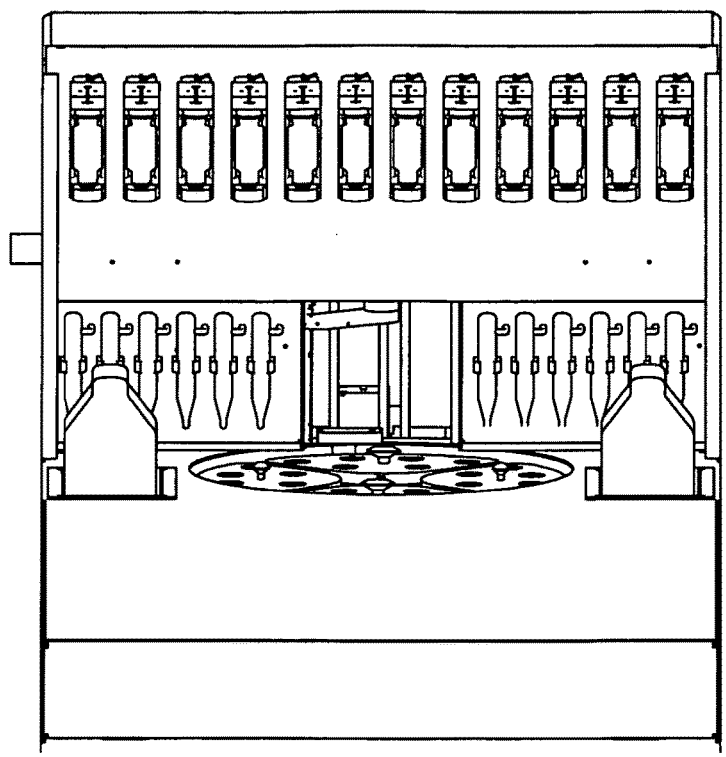
FIG. 27 is a perspective view of the peptide synthesizer showing the reaction vessels and prereaction vessels, amino acid weight guide and amino acid carousel, amino acid needle assembly, reagent bottles.
Figure 28:
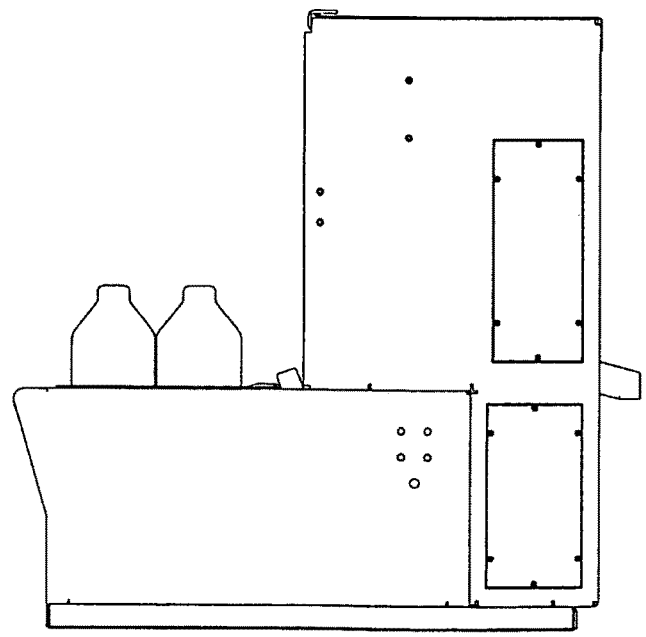
FIG. 28 is a right side view of the peptide synthesizer showing the reagent bottles and tube connections, waste connection, electronic compartment, solvent and reagent bottle connection, and nitrogen connection.
Figure 29:
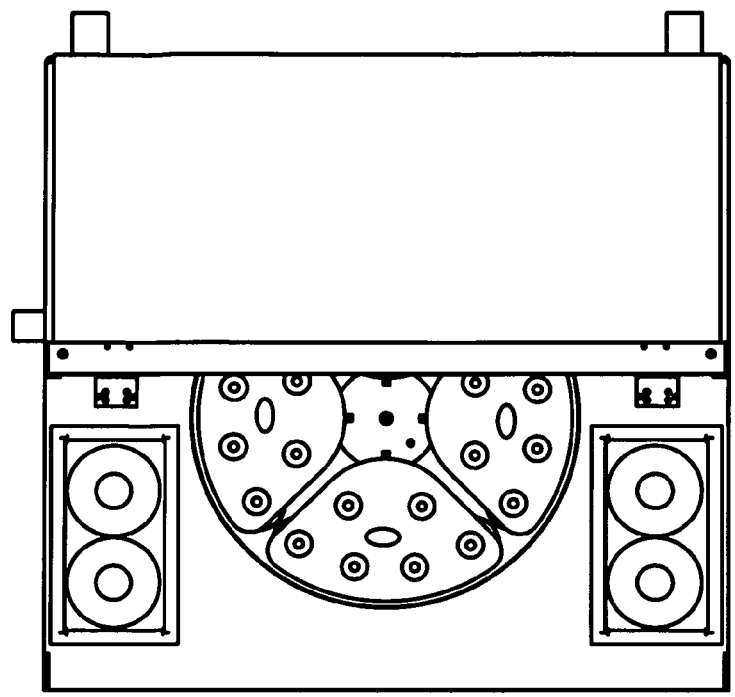
FIG. 29 is a top view of the peptide synthesizer showing the valves compartment, reagent bottles and connections, vent cabinet and weight plate indicator and weight plates.
Figure 31:
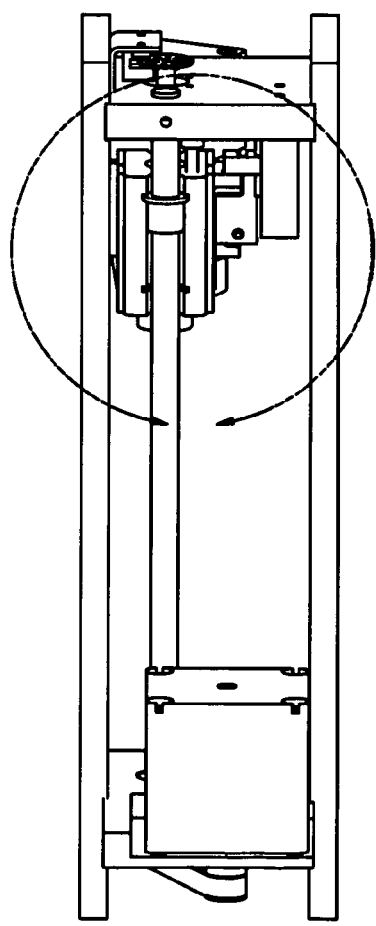
FIG. 31 is a perspective view of the amino acid delivery system.
Figure 32:
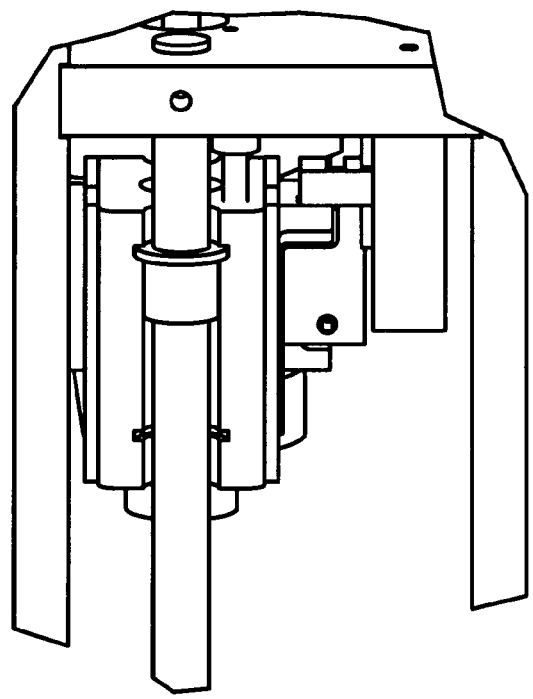
FIG. 32 is an enlargement of the of the amino acid rotary delivery system of FIG. 31 showing the z-axis stop, home position photo cell sensor, and liquid detection sensor.
Figure 30:
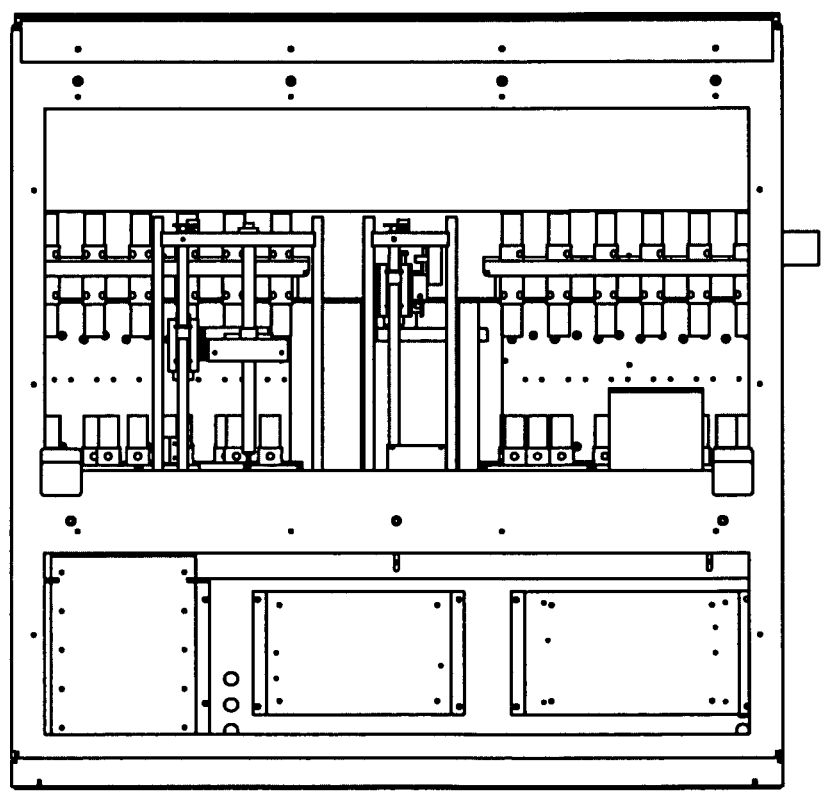
FIG. 30 is a front view of the peptide synthesizer showing the delivery valves, solvent/piperidine delivery assembly, stepper driver location, power supply location, waste connection, amino acid regents delivery needle assembly and waste connections.
Figure 34:
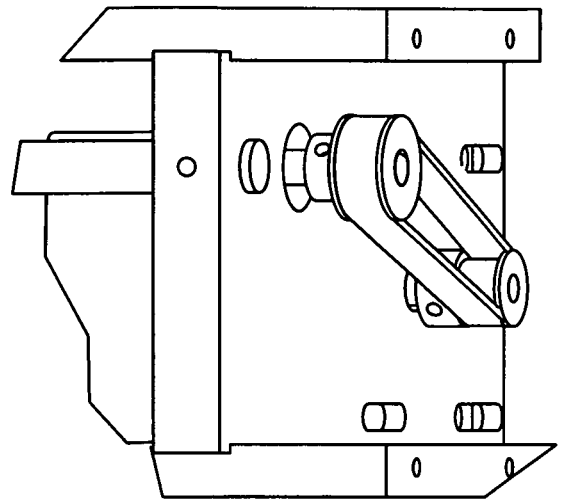
FIG. 34 is an enlarged view showing the drive belt assembly of FIG. 33.
Figure 33:
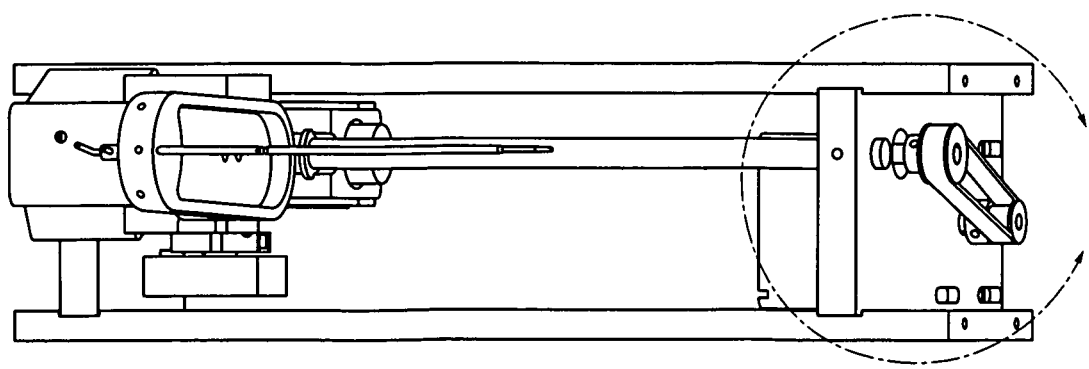
FIG. 33 is a bottom perspective view of the amino acid rotary delivery system showing the drive belts.
Figure 48:
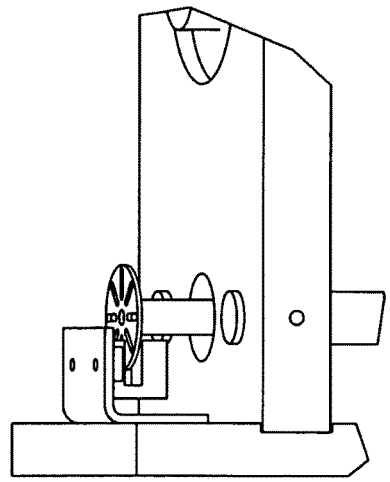
FIG. 48 is an enlarged view of the encoder wheel assembly of FIG. 35.
Figure 35:
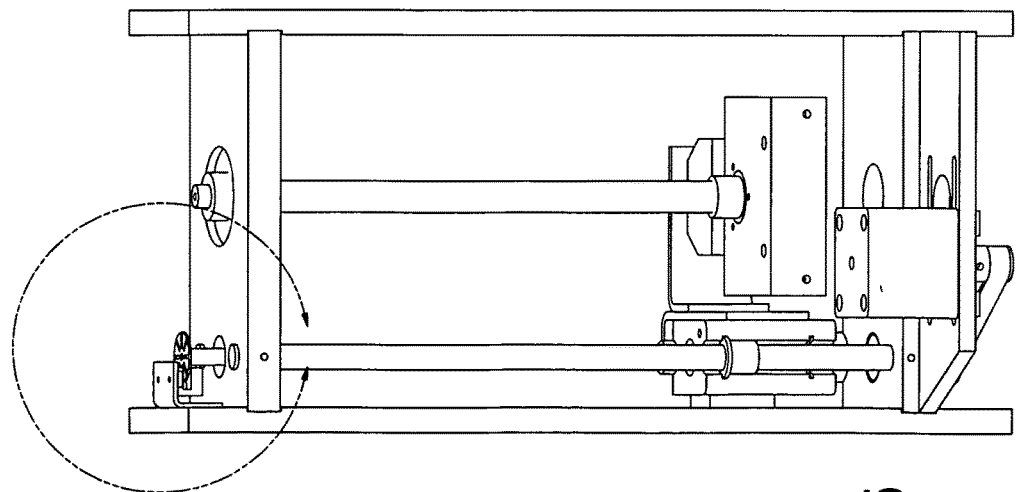
FIG. 35 is a perspective view showing the amino acid delivery needle probe assembly and encoder wheel assembly.
Figure 42:
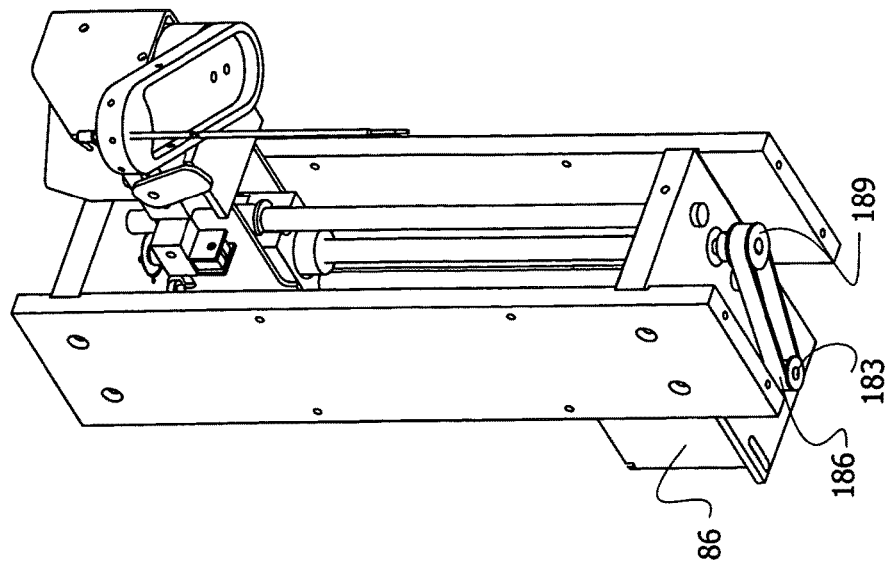
FIG. 42 is a perspective bottom and front view of the amino acid delivery assembly of FIG. 7.
Figure 41:
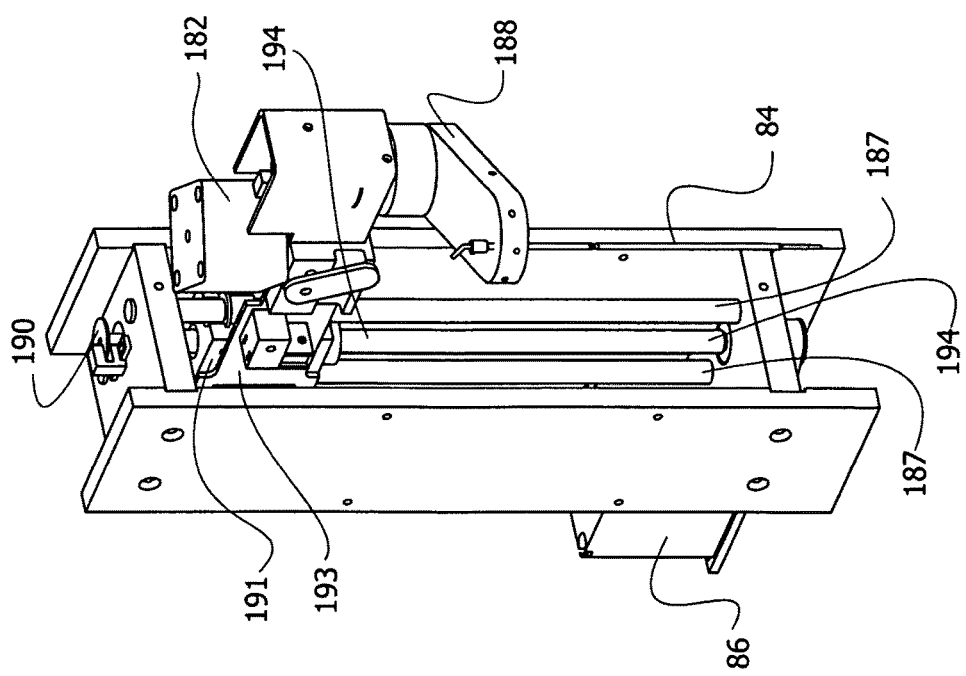
FIG. 41 is a perspective top and front view of the amino acid delivery assembly of FIG. 7.

The schematic of still another embodiment of the automated peptide synthesizer 400 is shown in FIG. 18. This automated peptide synthesizer 400 contains a cabinet 407, only 4 sets of reaction vessels RV1-4 and connected valves 1-10, 18 and 19, a pump 23, a motorized amino acid carousel 80, a needle probe assembly 85, a fluid metering assembly 303, reagent bottles 90 and 91, and flow monitoring photo cells PC 2-9, but does not include pre-reaction vessels as do the previously discussed embodiments. The omission of the pre-reaction vessels simplifies the processing and is the primary difference between peptide synthesizer 400 and peptide synthesizer 10 of FIGS. 3a. The down side, however, is the loss of the advantageous pre-reacting of the amino acids and reagents.

With reference to FIGS. 18-24, in order to process peptides within reaction vessel 402, for example, the user must first remove reaction vessel 402 from vessel holder 136, and place a selected amount of resin in the vessel 402. The user then returns the vessel 402 to holder 136. Now the computer 434 causes the carousel to align a particular amino acid bottle 82a directly under the needle probe of the amino acid delivery needle probe assembly 85. The needle probe is thrust downward into the amino acid bottle 82a by driving needle probe motor 86. Now, valves 5, 10 and 20 are energized to open a fluid path from the needle probe assembly 85 to reaction vessel 402, and pump 23 is started until the amino acid is delivered to vessel 402.

Now, the needle probe is withdrawn and rotated and plunged into a cleaning solution whereupon fluid is pumped into and out of the probe. If another amino acid is needed, the carousel 80 is rotated to the proper position and the needle probe assembly 85 thrusts the needle probe into the next amino acid bottle 82a to draw the proper amount of the that amino acid into vessel 402. Then the needle is cleaned as before. If a reagent is needed in vessel 402, valves 5, 10 and either 21 (for bottle 91) or 22 (for bottle 90) are energized and pump 23 is started until the proper amount of reagent is pumped into vessel 402. Now, the mixture in reaction vessel 402 is allowed to react for a specific amount of time (around 45 minutes to one hour) during which time peptides will grow on the resin beads. Now, the remainder of fluid in vessel 402 is drained by energizing valve 1 and 18. Valve 18 supplies pressurized nitrogen and valve 1 provides a fluid path from vessel 402 to a waste bottle.

At this point, the resins along with the attached peptides may be removed from the vessel 402 or, if needed, additional peptides may be grown onto the peptides already on the resins. To do this, repeat the previous paragraph.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. An automated peptide synthesizing machine comprising:
    a plurality of reagent containers;
    a plurality of pre-reaction vessels;
    a plurality of reaction vessels;
    at least one waste container;
    a power supply;
    a plurality of motor controllers;
    a motorized amino acid needle probe assembly including a needle probe movable down into or up out of an amino acid bottle or a needle probe cleaning agent bottle, and said motorized amino acid needle probe assembly including a needle probe arm rotatable to a selected horizontal position centered over said amino acid bottle or said needle probe cleaning agent bottle for drawing fluid therefrom into said needle probe and though a fluid line in fluid communication therewith to a selected pre-reaction vessel, said needle probe mounting on a first vertically movable carriage in cooperative engagement with a motor and drive means, said first vertically moveable carriage movable to a selected vertical position detected by an amino acid carriage sensor;
    an amino acid carousel comprising a turn table including a plurality of containers containing selected amino acids and means for rotational positioning of said amino acid carousel for cooperative engagement with said needle probe of said motorized amino acid needle probe assembly;
    a fluid metering assembly including a clear metering tube, a fluid level sensor disposed within a second moveable fluid metering carriage, said fluid sensor detecting a fluid level visible through said clear metering tube, and means for moving said second moveable fluid metering carriage vertically;
    a plurality of fluid and gas control valves and lines in fluid communication with said valves, said lines connecting said pre-reaction vessels to said reaction vessels and to said reagent bottles and said amino acid needle probe assembly and said at least one waste container and said metering vessel;

a plurality of pre-reaction vessels for pre-reaction of said amino acids and at least one selected reagent;

a plurality of reaction vessels in fluid communication with a selected one of said pre-reaction vessels for reacting at least one selected amino acid with at least one selected reagent producing at least one peptide.

2. The automated peptide synthesizing machine of claim 1, wherein said amino acid carriage sensor is a photocell.

3. The automated peptide synthesizing machine of claim 1, wherein said fluid sensor is a photocell.

4. The automated peptide synthesizing machine in claim 1 wherein said pre-reaction vessels range in number from 4-16 and reaction vessels range in number from four to 16.

5. The automated peptide synthesizing machine of claim 1 further comprising a computer in electrical communication therewith.

6. The automated peptide synthesizing machine of claim 1, wherein each reaction vessel includes a holder having a top grip to release the reaction vessel, top seal spring loaded holder, reaction top seal, bottom reaction vessel seal, filter holder inside of the reaction vessel, glass reaction vessel, pivot rod and cabinet attachment block.

7. The automated peptide synthesizing machine in claim 1 wherein said motorized rotatable amino acid carousel includes a plurality of removable sub-trays each one containing a plurality of amino acid containers.

8. A method of simultaneously synthesizing a plurality of peptides with said automated peptide synthesizing machine of claim 1, comprising the steps of:

said motorized amino acid needle probe assembly moving said needle probe down into an amino acid bottle drawing fluid containing an amino acid up into said needle probe and through a connected line to a selected pre-reaction vessel;

a) rotating said needle probe arm to a horizontal position centered over a selected first pre-reaction vessel containing a selected pre-reacting reagent, said position detected by said sensor;
b) lowering said needle probe to a selected position injecting said amino acid into said pre-reaction vessel containing said pre-reacting agent for pre-reaction thereof;
c) raising and removing said needle probe from said pre-reaction vessel;
d) rotating said needle probe arm to a horizontal position centered over a selected container containing a cleaning solution, said position detected by said sensor;
e) lowering said needle probe to a selected position rinsing said needle probe;
f) repeating steps b-d to fill all of said pre-reaction vessels;
g) at a selected time,
h) rotating said needle probe arm to a horizontal position centered over a selected first reaction vessel containing a selected reacting reagent, said position detected by said sensor;
b) lowering said needle probe to a selected position injecting said pre-reacted amino acid into said reaction vessel containing said reacting agent for reaction thereof;
c) raising and removing said needle probe from said reaction vessel;
d) rotating said needle probe arm to a horizontal position centered over a container containing a cleaning solution, said position detected by said sensor;
e) lowering said needle probe to a selected position rinsing said needle probe;
f) repeating steps h-e to fill all of said reaction vessels synthesizing differing and distinct peptides in a plurality of reaction vessels simultaneously for a selected period of time.

* * * * *